US006972735B2

(12) United States Patent
Hebert

(10) Patent No.: US 6,972,735 B2
(45) Date of Patent: Dec. 6, 2005

(54) HEAD-MOUNTED VIEWING SYSTEM FOR SINGLE ELECTRONIC DISPLAYS USING BIOCULAR LENS WITH BINOCULAR FOLDING MIRRORS

(75) Inventor: Raymond Hebert, Los Gatos, CA (US)

(73) Assignee: Raymond T. Hebert, Florence, OR (US)

(*) Notice: Subject to any disclaimer, the term of this patent is extended or adjusted under 35 U.S.C. 154(b) by 419 days.

(21) Appl. No.: 10/392,494

(22) Filed: Mar. 18, 2003

(65) Prior Publication Data

US 2004/0004584 A1    Jan. 8, 2004

Related U.S. Application Data

(60) Provisional application No. 60/366,446, filed on Mar. 20, 2002.

(51) Int. Cl.[7] .............................................. G09G 5/00
(52) U.S. Cl. .......................................... 345/8; 359/630
(58) Field of Search ...................... 345/7–9; 359/13, 359/630, 640; 348/51; 349/11

(56) References Cited

U.S. PATENT DOCUMENTS

| | | | |
|---|---|---|---|
| 2,973,683 A | 3/1961 | Rowe et al. | |
| 3,059,519 A | 10/1962 | Stanton | |
| 3,674,925 A | 7/1972 | Heckman, Jr. | |
| 5,005,213 A | 4/1991 | Hanson et al. | |
| 5,035,474 A | 7/1991 | Moss et al. | |
| 5,483,307 A | 1/1996 | Anderson | |
| 5,572,343 A * | 11/1996 | Okamura et al. | 349/74 |
| 5,619,373 A * | 4/1997 | Meyerhofer et al. | 359/482 |
| 5,650,955 A | 7/1997 | Puar et al. | |
| 5,661,603 A | 8/1997 | Hanano et al. | |
| 5,739,955 A | 4/1998 | Marshall | |
| 5,751,493 A | 5/1998 | Hur | |
| 5,808,802 A * | 9/1998 | Hur | 359/630 |
| 5,825,456 A * | 10/1998 | Tabata et al. | 351/201 |
| 5,926,318 A | 7/1999 | Hebert | |
| 5,973,845 A | 10/1999 | Hildebrand et al. | |
| 6,008,939 A * | 12/1999 | Hebert | 359/475 |
| 6,040,946 A * | 3/2000 | Hebert | 359/630 |
| 6,055,109 A | 4/2000 | Hur | |
| 6,067,190 A | 5/2000 | Kelly | |
| 6,094,309 A | 7/2000 | Ophey | |
| 6,097,543 A | 8/2000 | Rallison et al. | |
| 6,101,038 A | 8/2000 | Hebert et al. | |
| 6,219,186 B1 * | 4/2001 | Hebert | 359/618 |
| 6,232,934 B1 * | 5/2001 | Heacock et al. | 345/8 |
| 6,239,908 B1 | 5/2001 | Kelly | |
| 6,246,383 B1 | 6/2001 | Ophey | |
| 6,329,965 B1 | 12/2001 | Lee | |
| 6,522,474 B2 * | 2/2003 | Cobb et al. | 359/633 |

* cited by examiner

Primary Examiner—Amare Mengistu
(74) Attorney, Agent, or Firm—Ganz Law, P.C.; Bradley M. Ganz

(57) ABSTRACT

The present invention provides a head-mounted display system that is compact and provides a wide field of view yet reduces or eliminates eyestrain. The system includes a binocular on-axis objective lens assembly that relays an image from a display device through a split-field exit aperture onto binocular optical paths. Intermediate image planes are formed within each optical path with each intermediate image plane having an associated microstructure that enhances the exit pupil of each left and right optical path.

29 Claims, 18 Drawing Sheets

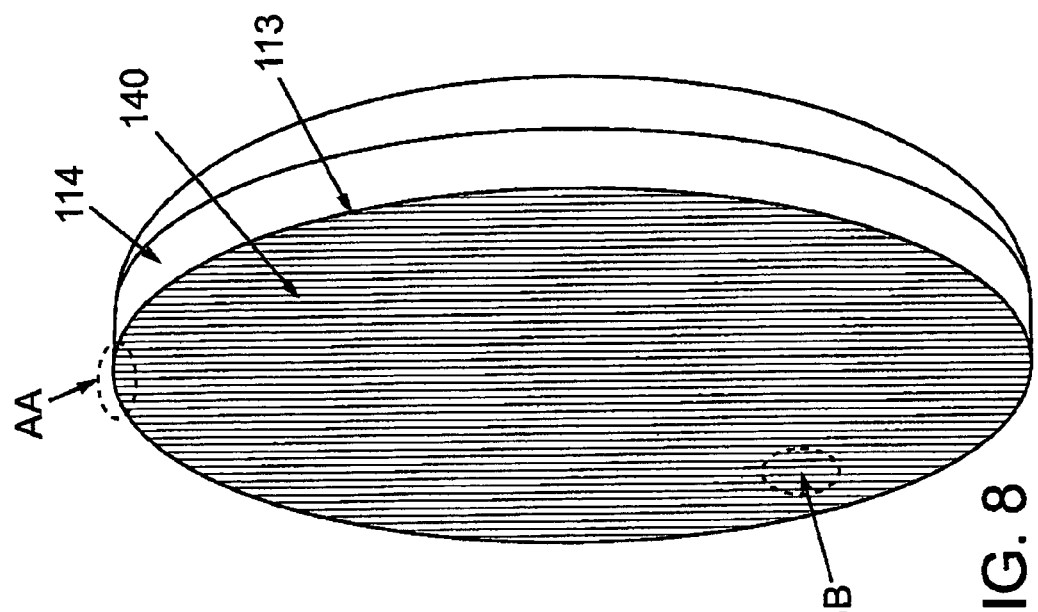
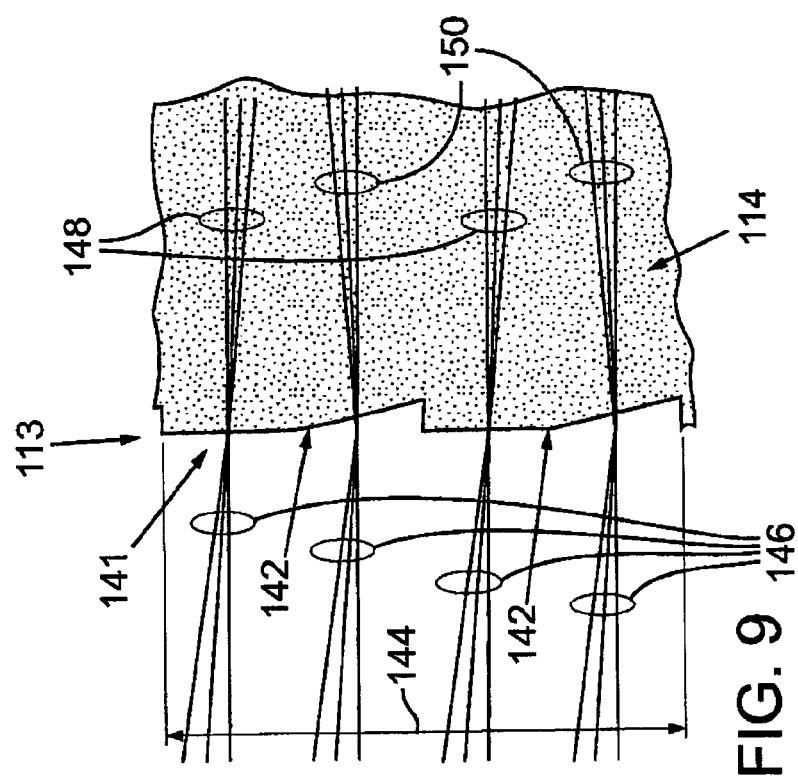

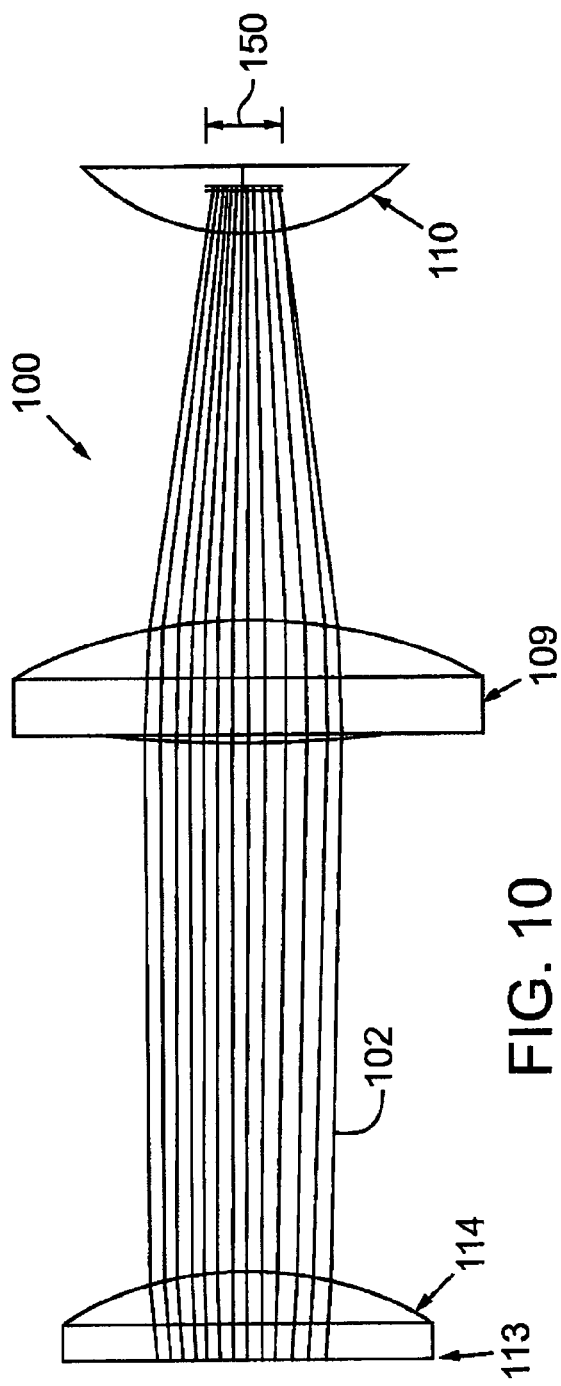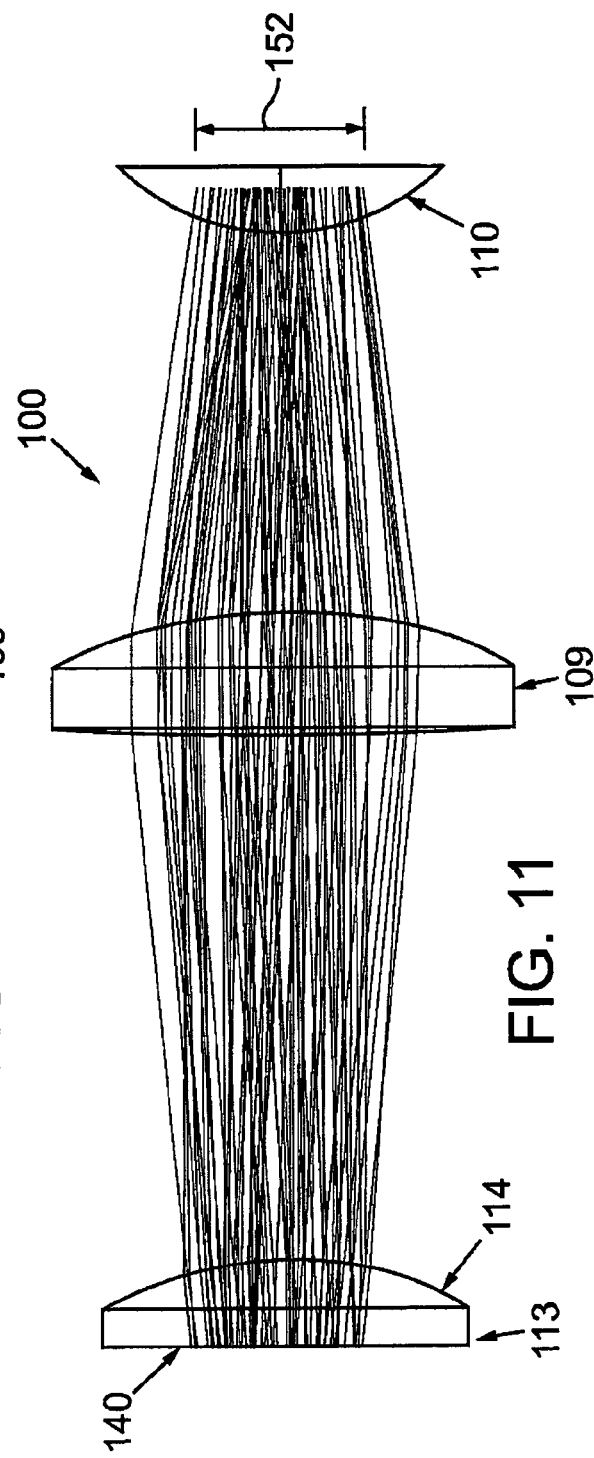

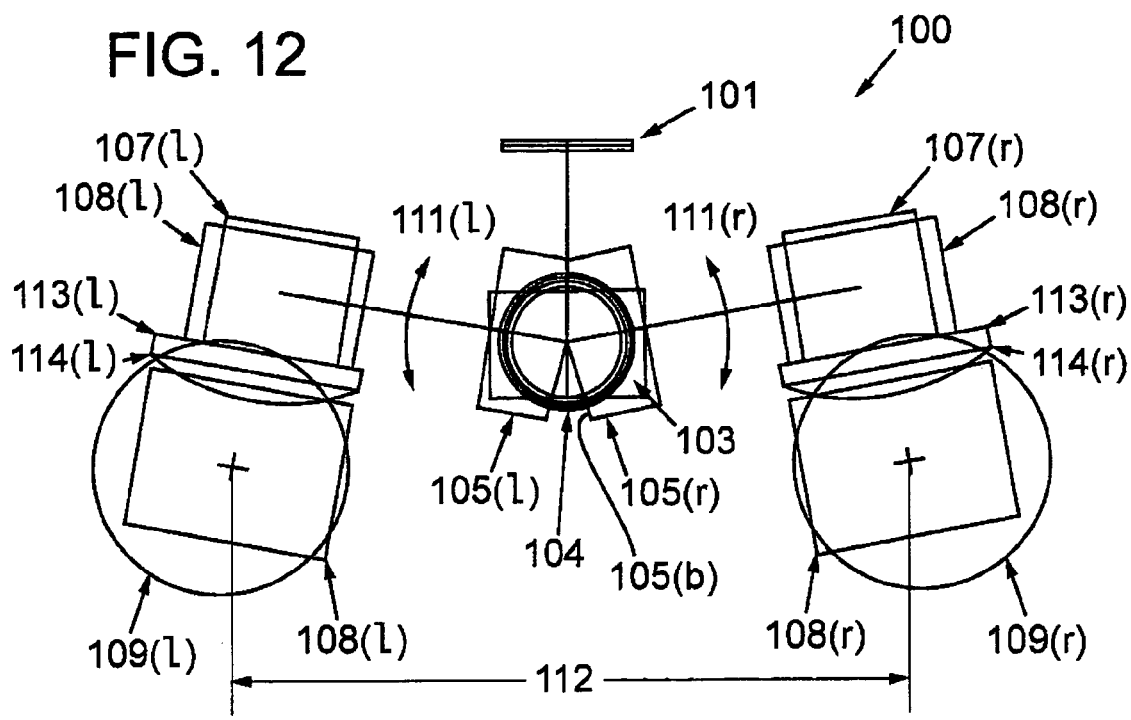
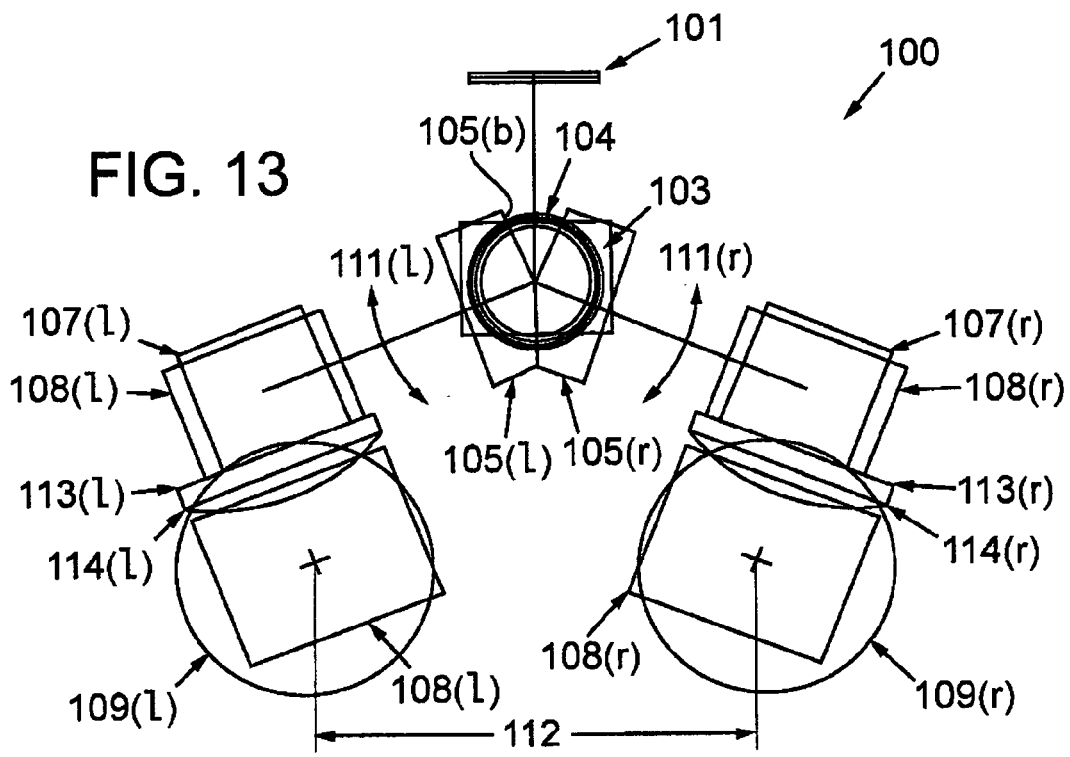

HEAD-MOUNTED VIEWING SYSTEM FOR SINGLE ELECTRONIC DISPLAYS USING BIOCULAR LENS WITH BINOCULAR FOLDING MIRRORS

This invention claims the benefit of U.S. Provisional Application No. 60/366,446, entitled HEAD-MOUNTED VIEWING SYSTEM FOR SINGLE ELECTRONIC DISPLAYS USING BIOCULAR LENS WITH BINOCULAR FOLDING MIRRORS, filed on Mar. 20, 2002, the entire disclosure of which is hereby incorporated by reference as if set forth in its entirety for all purposes.

FIELD OF THE INVENTION

This invention is directed to image display systems, and more particularly to head-mounted display systems having binocular and stereographic capability using a single microdisplay device.

BACKGROUND OF THE INVENTION

Head-mounted display systems have been known and used for various applications such as, for example, in the medical field for remote viewing of surgical procedures and in the military field for flight training and night vision.

Head-mounted display (HMD) systems can be immersive (excluding surrounding ambient imagery) or nonimmersive. A nonimmersive design is desired for applications where visual contact with the surroundings is preferred. Some nonimmersive designs have included semitransparent mirrors in place of eyepieces so that the display's virtual image is superimposed on the ambient surroundings. However, this dilutes the contrast of the image and generally increases the size of the HMD, neither of which is desirable for most applications.

A preferred design must generally be compact to facilitate comfort and peripheral vision while having a functionally wide field of view with sufficient eye relief to accommodate the user's normal corrective eyewear, if necessary. For applications involving computer display with text, a field of view in the vicinity of 30 degrees diagonally provides sufficient resolution while avoiding eye fatigue related to long-term scanning of larger fields. An eye relief in the vicinity of one inch is sufficient to clear eyewear. Further, there should be sufficient exit pupil and eyebox to support a quality image. As is known in the art, the exit pupil is a radial two-dimensional space located at an ideal position along the optical axis of the eyepiece within which the eye can view the virtual image. The eyebox is a three-dimensional space formed by extending the exit pupil along the optical axis to either side of the ideal position.

Some display systems are binocular systems defined as one in which both eyes are used, but each eye views an image through a separate optical train. Warren J. Smith, *Modern Optical Engineering*, (SPIE Press, McGraw-Hill, 2000, p. 444). Many HMDs are of this type and have two displays, two eyepieces, and two illumination systems. Other single-display systems are binocular systems defined as one in which both eyes view an image through a single optical system. Still other display systems are combination binocular-binocular systems having a common objective or display and, where required, a common illumination subsystem (binocular) with separate optical paths to each eye (binocular). The imaging optics for these binocular or binocular-binocular systems may include various arrangements of mirrors, prisms, beam splitters, and lenses. The microdisplay is generally the single most expensive component in the HMD. Thus, a binocular or binocular-binocular system is advantageous because the cost of adding binocular or binocular-binocular optics is much less than the cost of an additional microdisplay. Such binocular or binocular-binocular systems are additionally advantageous because they achieve equivalent or better performance than binocular systems.

One difficulty in designing with small microdisplays is achieving the desired ergonomics of the exit pupil and the eyebox. A typical microdisplay measures approximately 0.5 inch diagonally. It is particularly difficult to design an eyepiece having an aggressively short focal length with an aperture somewhat less than f/1. However, these design aspects are necessary in order to achieve a 30 degree field of view and 1 inch eye relief. For such eyepieces, there are several image quality factors that are affected by the position of the viewer's pupil within the exit pupil and eyebox. Examples of such factors include resolution, distortion, uniformity of illumination, and vignetting. The deterioration of any one of these variables beyond an acceptable limit can result in an unacceptable image or eyestrain for the user. Some have attempted to resolve this problem by providing a larger illumination exit pupil. However, such attempts often allow for significant off-axis deterioration of resolution and distortion that actually promote eyestrain.

Another related difficulty with the design of such compact display systems is the design of an illumination system that is compatible with the design of the eyepieces, exit pupil, and eyebox. In biocular or biocular-binocular systems, considerable working distance is required between the eyepieces and the display device in order to fold and split image paths so that both eyes can view an image from a single display. As pointed out above, the eyepieces must have a short focal length to achieve a significant or desired field of view. In order to overcome such limitations some prior art devices create an intermediate image of the display in proximity to each eyepiece. However, this solution requires a more complex design resulting in an illumination path that is likely to be incompatible with the eyepieces and eyebox. Therefore, additional devices such as, for example, a field lens or diffuser, is required to reshape the illumination distribution for eyepiece compatibility.

Yet another related difficulty with the design of such compact display systems is the variation of interpupilary distance (IPD) among users. There is a wide range of IPD in the adult population (51 mm for the fifth percentile of females to 71 mm for the ninety-fifth percentile of males). Some prior art devices have attempted to satisfy this range by designing the HMD with a fixed intermediate IPD. However, this will inevitably cause eyestrain for a significant percentage of users for eyepiece design reasons cited above. Additionally, the eyes' stereo vergence angle (about 1.8 degree per eye at a 36 inch viewing distance) is physiologically closely coupled to the eyes' point of focus. Any significant decentering from the eyepiece's optical axis will likely introduce prism power, thereby modifying the vergence. Therefore, it is highly desirable for an HMD to have an adjustable IPD for prolonged visual comfort.

Still other related difficulties with the design of such compact display systems are physical and psychological comfort, appearance, and convenience. As for mounting and placement, some users are uncomfortable with weight on the bridge of the nose or the ears. Other users are sensitive to pressure on the forehead. Additionally, physical layout of the HMD often interferes with peripheral vision which limits professional contact and restricts eye-hand coordination, or in some case, creates nausea associated with isolation from outside visual references. Most designs are tethered to their video source with a cable, restricting motion and creating pull.

SUMMARY OF THE INVENTION

The present invention overcomes the above difficulties by providing a head-mounted display system that is compact and provides a wide field of view yet reduces or eliminates eyestrain. The embodiments of the present invention are uniquely adapted for use with a number of different microdisplay devices, including emissive, transmissive, and reflective devices.

In accordance with the present invention, a stereo-capable biocular-adjustable binocular display system is provided that utilizes a single display with an optical train having optical elements that are more efficient and less expensive than have been employed in prior art devices.

A biocular on-axis objective lens assembly relays an image from the display device onto binocular paths with two intermediate image planes, one for each left and right eye, through a split-field exit aperture formed by at least two reflecting surfaces proximate to the exit aperture of the objective lens assembly. A diffusing prismatic or toroidal microstructure and field lens are employed coincidentally with each intermediate image plane to enhance the system exit pupil while retaining image quality for reduced eyestrain. The microstructure further recovers and enhances the exit pupil of each left and right optical subassembly by unique utilization and placement of the microstructure. This, along with the eyepiece design, precisely defines the system's exit pupil without unintended routing or scattering of illumination to precisely define the viewing space where acceptable image quality exists, thereby minimizing eyestrain.

Another aspect of the present invention allows the left and right optical subassemblies to be rotated about a central axis to adjust to the viewer's interocular distance without resulting in image rotation. To achieve this aspect of the invention the display and objective lens operate along the central axis or folded central axis and the left and right optical subassemblies rotate about the central axis for interocular adjustment. Each left and right optical subassembly includes a series of reflecting surfaces to eliminate image rotation during interocular adjustment. The reflecting surfaces also provide a symmetrical image to each eye. Each left and right optical subassembly includes an intermediate image plane, diffusing prismatic microstructure, field lens within a series of reflecting surfaces, and an eyepiece lens.

The present invention further provides multiple embodiments that utilize various display devices, including transmissive, reflective, or emissive types. Single-channel or time-multiplexed stereographic illumination schemes are provided for transmissive or reflective types of display devices.

The present invention further provides for a single housing design that accommodates a variety of systems depending on the type of display device and illumination components.

The present invention provides for a mounting mechanism to attach the head-mounted display system to a visor of a sports cap. The entire system is lightweight and untethered and operates with a radio frequency or infrared video interface. An infrared interface provides for color-composite video and pixel clock channels for precise pixel data registration with low bandwidth, power consumption, and cost.

The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

FIG. 8 is a perspective view of an intermediate image plane formed on a field lens having a microstructure scattering surface.

FIG. 9 is a partial view of segment AA of FIG. 8.

FIG. 10 is a schematic view of a portion of an imaging system showing an eyepiece exit pupil formed by a conventional intermediate image plane and field lens.

FIG. 11 is a schematic view of a portion of an imaging system according to the present invention showing an eyepiece exit pupil formed by an intermediate image plane and field lens with an associated microstructure surface.

FIG. 12 is a front view of the HMD system of the present invention showing the binocular mirrors rotated for maximum interpupilary spacing.

FIG. 13 is a view similar to FIG. 8 showing the binocular mirrors rotated for minimum interpupilary spacing.

DETAILED DESCRIPTION

The present invention provides a HMD system that is compact yet provides a wide field of view and reduces or eliminates eyestrain. The present invention is uniquely adapted for use with a number of different microdisplay devices, including emissive, transmissive, and reflective devices. For example, the display device may be a light emissive display, an electroluminescent device, or a diffusely backlit transmissive device. One example of a light emissive microdisplay device is the SVGA+ manufactured by eMagin Corporation of Hopewell Junction, N.Y. An example of an electroluminescent device is the MicroBrite AMEL640.480, manufactured by Planar America, Inc. of Beaverton, Oreg. An example of a diffusely backlit transmissive device is the CyberDisplay 640 Color manufactured by Kopin Corporation of Tauton, Mass.

Figure 1:
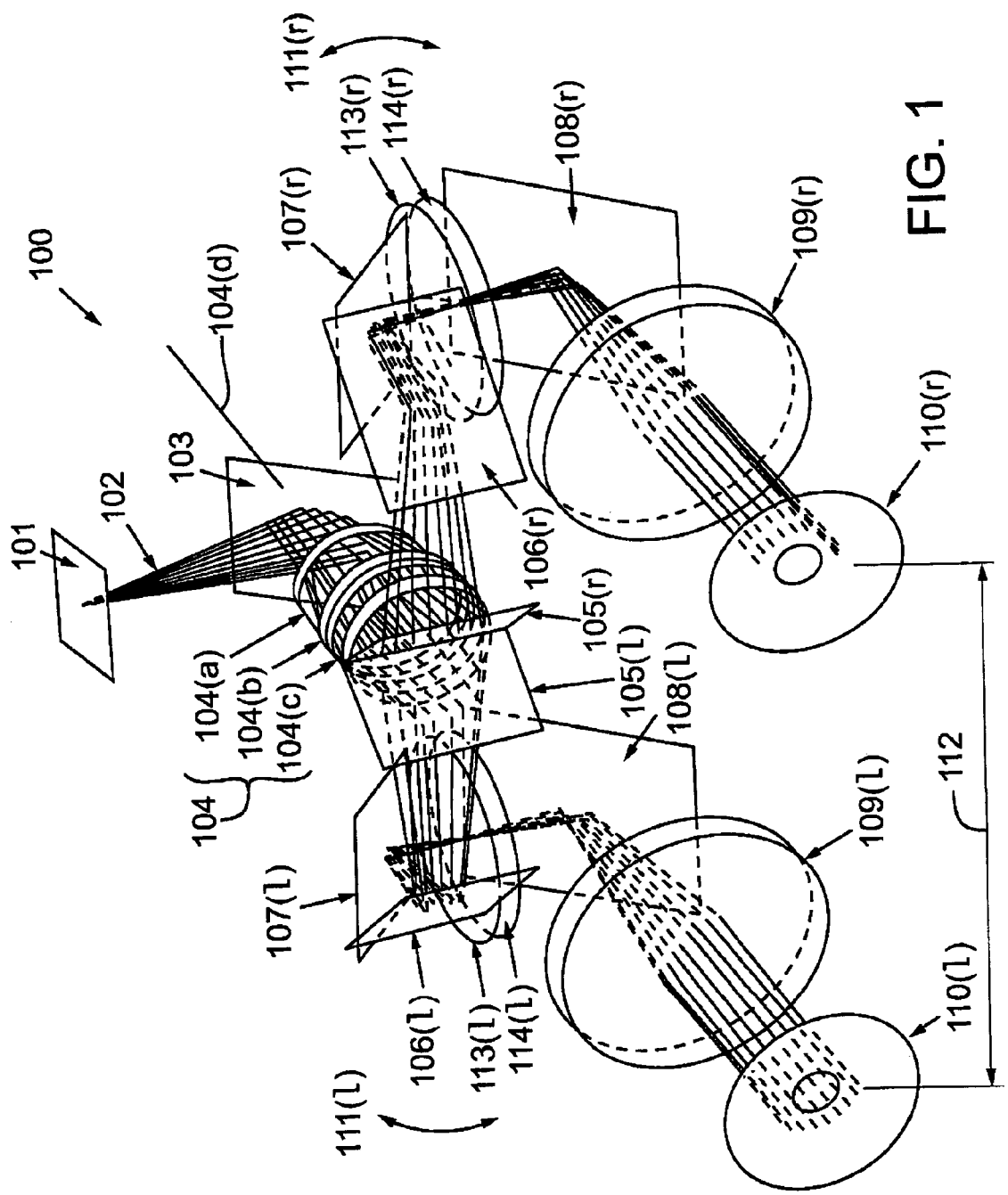
FIG. 1 is a perspective view of an on-axis biocular-binocular HMD viewing system in accordance with this invention.

FIG. 1 shows one preferred embodiment of an HMD system 100 of the present invention that utilizes a single display device 101 having a plurality of display pixels on a substantially planar display surface to project an image to a viewer. Light 102 emanates from each pixel and is folded through a reflective surface 103, which is preferably a first surface mirror, to an objective lens assembly 104 including plural lenses 104(a), 104(b), and 104(c). Display device 101 is centered on and orthogonally situated with respect to an optical axis 104(d) of objective lens assembly 104. In this embodiment, display device 101 is preferably a light emissive microdisplay device such as the SVGA+ manufactured by eMagin Corporation of Hopewell Junction, N.Y.

Light 102 propagates through objective lens assembly 104 and is split by reflective surfaces 105(r) and 105(l) into identical but mirrored right and left paths, respectively. Reflective surfaces 105(r) and 105(l) are preferably first surface mirrors. Light 102 is further propagated along the right optical path through a subassembly comprising reflective surfaces 106(r), 107(r), and 108(r) to eyepiece 109(r) and on to exit pupil 110(r). Similarly, light 102 is further propagated along the left optical path through a subassembly comprising reflective surfaces 106(l), 107(l), and 108(l) to eyepiece 109(l) and on to exit pupil 110(l). Reflective surface pairs 105(r) and 106(r) are positioned with their respective optical axes nominally orthogonal to reflective surface pairs 107(r) and 108(r). Likewise, reflective surface pairs 105(l) and 106(l) are positioned with their respective optical axes nominally orthogonal to reflective surface pairs 107(l) and 108(l). As such, these reflective surface pairs have a binocular function in that they transfer the image from objective lens assembly 104 to eyepieces 109(r) and 109(l) in a symmetrical fashion.

Another binocular aspect of the reflective surface pairs is that the right and left subassemblies can be rotated about the optical axis 104(d) without rotating the image. Thus, the right and left subassemblies can be rotated through small angles represented by arrows 111(r) and 111(l) to accommodate the viewer's interocular distance 112.

The image from display device 101 is formed onto intermediate image planes 113(r) and 113(l) formed and located, respectively, in the right and left subassemblies. Specifically, intermediate image plane 113(r) is located between reflective surfaces 107(r) and 108(r) and is closely adjacent field lens 114(r). Preferably, intermediate image plane 113(r) is formed on a rear planar surface of field lens 114(r). Intermediate image plane 113(l) is similarly formed and located between reflective surfaces 107(l) and 108(l) and is closely adjacent field lens 114(l) or, preferably, is formed on a rear planar surface of field lens 114(l). Each intermediate image plane and field lens combination 113(r), 114(r) and 113(l), 114(l) includes an associated microstructure to enhance the exit pupils 110(r) and 110(l). Because the exit pupil of the objective lens assembly 104 is shared between left and right paths the left and right exit pupils 110(r) and 110(l) are cut in half vertically by reflective surfaces 105(r) and 105(l). The microstructure preferably includes a vertically oriented prismatic or lens structure that recovers and enhances the exit pupils 110(r) and 110(l) as will be discussed more fully below. Thus, light 102 propagates through objective lens assembly 104, field lenses 114(r), 114(l) and eyepiece lenses 109(r), 109(l) to form the viewer's virtual image and exit pupil 110(r), 110(l). Objective lens assembly 104 has a low f/number and the three lens elements 104(a), 104(b), and 104(c) provide an image with high resolution and low distortion and also allow a relatively wide and flat field.

Figure 2:
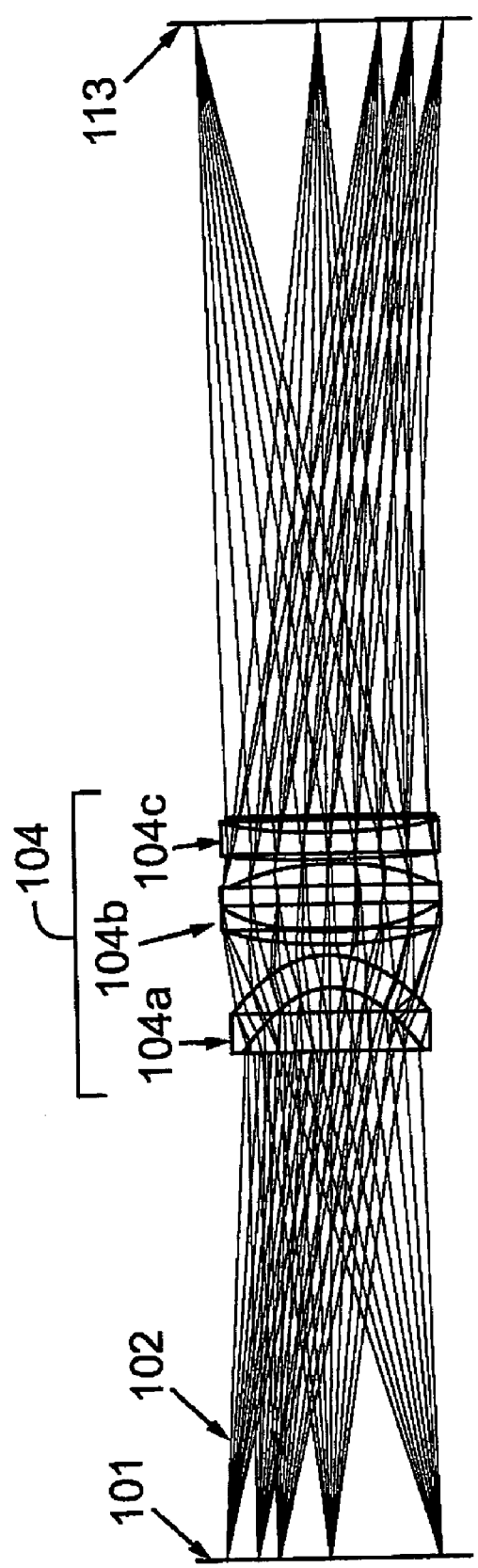
FIG. 2 is a schematic view of the system of FIG. 1 shown unfolded with a multi-element objective lens.

FIG. 2 is a simplified partial view of the system of FIG. 1 from display device 101 to intermediate image planes 113(r), 113(l) with reflective surfaces 103, 105(r), 105(l), 106(r), 106(l), 107(r), and 107(l) eliminated to better show lens assembly 104. Thus, in FIG. 2 intermediate image planes 113(r) and 113(l) are represented by one intermediate image plane 113. FIG. 2 better illustrates how the image is relayed from display device 101 through objective lens assembly 104 and onto intermediate image plane 113.

In FIG. 2, light 102 emanates from display device 101 and propagates through objective lens assembly 104 and onto intermediate image plane 113. Objective lens assembly 104 includes an acrylic dual aspheric meniscus lens 104(a), preferably made of acrylic, that initially collects light 102 as it propagates through to a spherical doublet lens 104(b), preferably made of SF14 and BK7 glass. Light 102 propagates through lens 104(b) through to corrector plate lens 104(c), preferably made of polystyrene, and onto intermediate image plane 113. The combination of glass and polymer lens elements results in a high-performance lens assembly 104 that is more thermally stable and is capable of being consistently manufactured.

Figure 3:
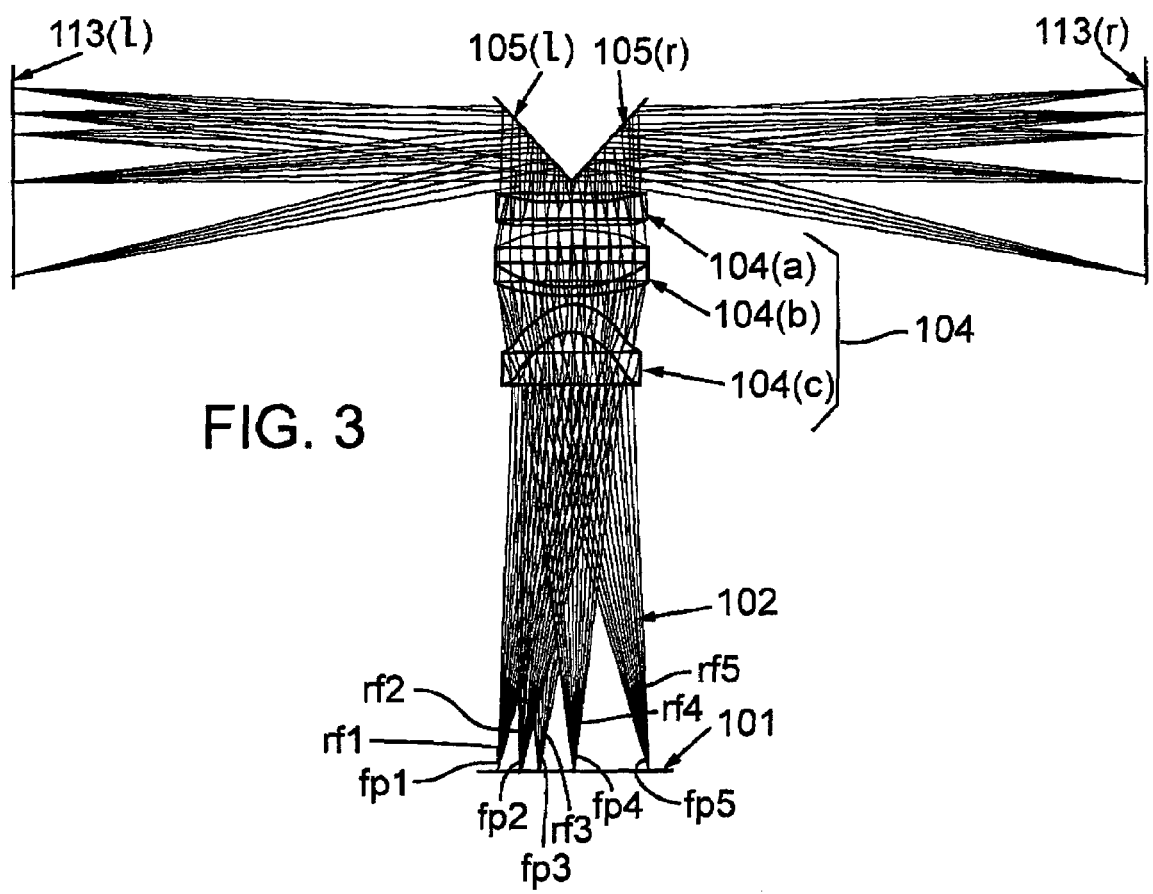
FIG. 3 is a schematic view of the system of FIG. 2 shown partially folded with split-field directing mirrors at the objective lens exit aperture and double image planes.

FIG. 3 is a view similar to FIG. 2 with the addition of reflective surfaces 105(r) and 105(l) adjacent objective lens assembly 104 to illustrate the formation of intermediate image planes 113(r) and 113(l). Display device 101 is illustrated with only five field points fp1, fp2, fp3, fp4, and fp5 for clarity. Each of the field points emits a corresponding bundled ray fan rf1, rf2, rf3, rf4, and rf5. These ray fans rf1–rf5 form chief rays located between display device 101 and reflective surfaces 105(r) and 105(l). Reflective surfaces 105(r) and 105(l) split the horizontal ray fans rf1–rf5 so that the ray fans on the left of the chief rays are directed to the left and onto intermediate image plane 113(l) and the bundled ray fans on the right of the chief rays are directed to the right and onto intermediate image plane 113(r).

Figure 4:
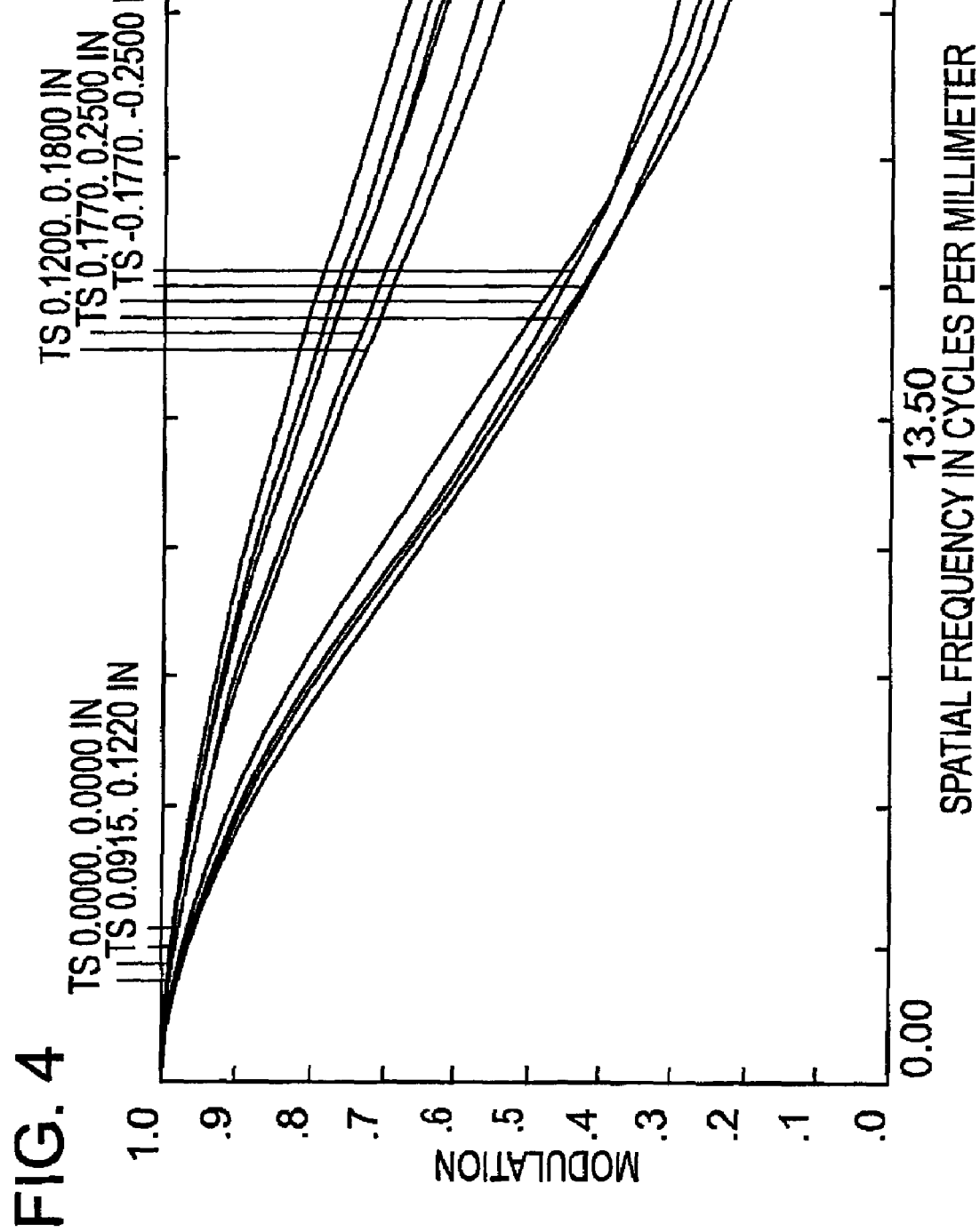
FIG. 4 is a graph showing the geometric modulation transfer function of the image quality at each image plane.

FIG. 4 is a graphic illustration that shows the plot of the modulation transfer function (MTF) at each intermediate image plane 113(r) and 113(l). The limiting spatial frequency of 27 cycles/mm (or 27 pixel-pair/mm) represents the Nyquist frequency of a preferred display device having approximately 600 pixels vertical×800 pixels horizontal. This illustrates that the design of the present invention exhibits significant residual modulation at the Nyquist frequency to resolve single pixels across the entire field of view, and is capable of accommodating even higher resolution display devices.

Figure 5:
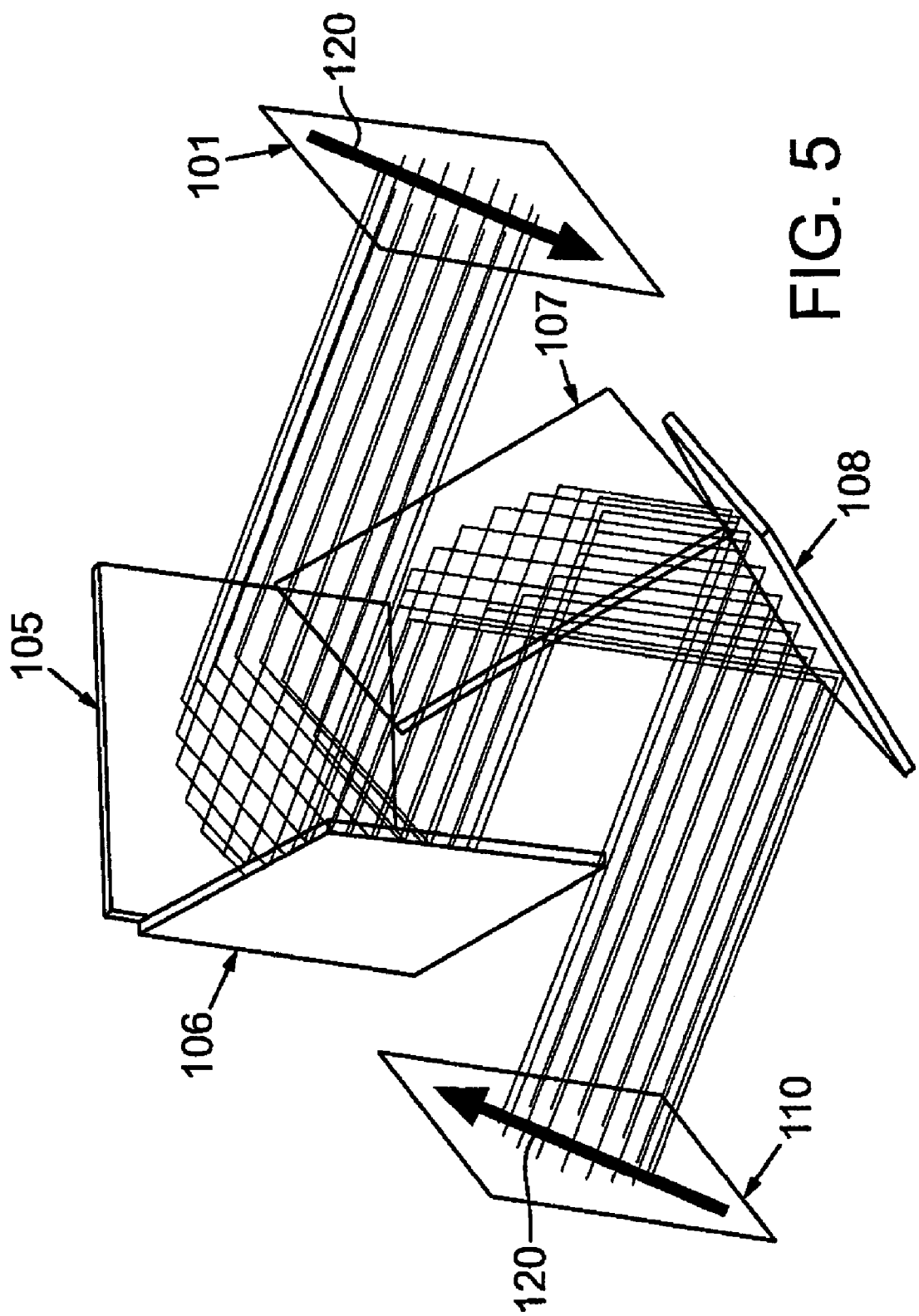
FIG. 5 is a schematic view of an optical path of one side of the system of FIG. 1 utilizing mirrors, an intermediate image plane, and field lens to achieve a binocular function.

1. FIG. 5 is a simplified illustration of the image system in FIG. 1 to illustrate how the image is projected along one side of the system to eyebox 110 through simple reflective surface pairs. An image represented by arrow 120 is projected longitudinally and laterally from display device 101 to eyebox 110 through 90-degree reflecting surface pairs 105, 106, and 107, 108, as orthogonal sets, respectively. For illustrative clarity, reflective surface 103, lens assembly 104, intermediate image plane 113, field lens 114, and eyepiece lens 109 have been omitted and light rays 102 are illustrated as a collimated bundle. Image 120 as projected on eyebox 110 is reversed from its original position as projected from display device 101. However, image 120 remains rotationally stationary even as reflective surfaces 106, 107, and 108 are rotated as a unitary structure, for example, through angles represented by arrows 111(*r*) and 111(*l*) in FIG. 1. Thus, the reflective surfaces function as a set of binocular porro prisms. For example, the function of reflective surfaces 107 and 108 is typically carried out by a solid porro prism (one for each left and right side of the system). However, the use of simple reflective surfaces 107 and 108 allows for placement of additional optical elements (113 and 114) in the air space between them. This would not be possible with solid porro prisms. Placement of intermediate image plane 113 and field lens 114 between reflective surfaces 107 and 108 allows for a more compact design that could not previously be achieved in prior systems using porro prisms. Additionally, the use of simple reflective surfaces is preferable over the use of porro prisms because solid porro prisms add weight, bulk, and expense to the system.

Reflective surfaces 105 and 106 are preferably mirrors but may be a simple right angle prism, or a combination thereof. The size of reflective surfaces 105, 106, 107, and 108 can be selected to accommodate various local convergence and divergence of light rays. Thus, the smallest possible reflective surface can be selected which is advantageous because size and weight are minimized.

One important aspect of the present invention is the formation of the exit pupil. At least part of the viewer's eye pupil diameter must be within the exit pupil in order to see an image. The exit pupil must also accommodate the viewer's eye rotation and displacement as the eye scans over the angular field of view of the virtual image. Preferably, the vertical and horizontal extent of the exit pupil should exceed that of the viewer's eye pupil diameter and eye motion so that alignment of the HMD with respect to the viewer's eye is less critical. However, the present invention controls the size of the exit pupil to obtain an exit pupil that is large enough for a comfortable ergonomic fit but not so large as to reduce intensity to an uncomfortable level.

Figure 6:
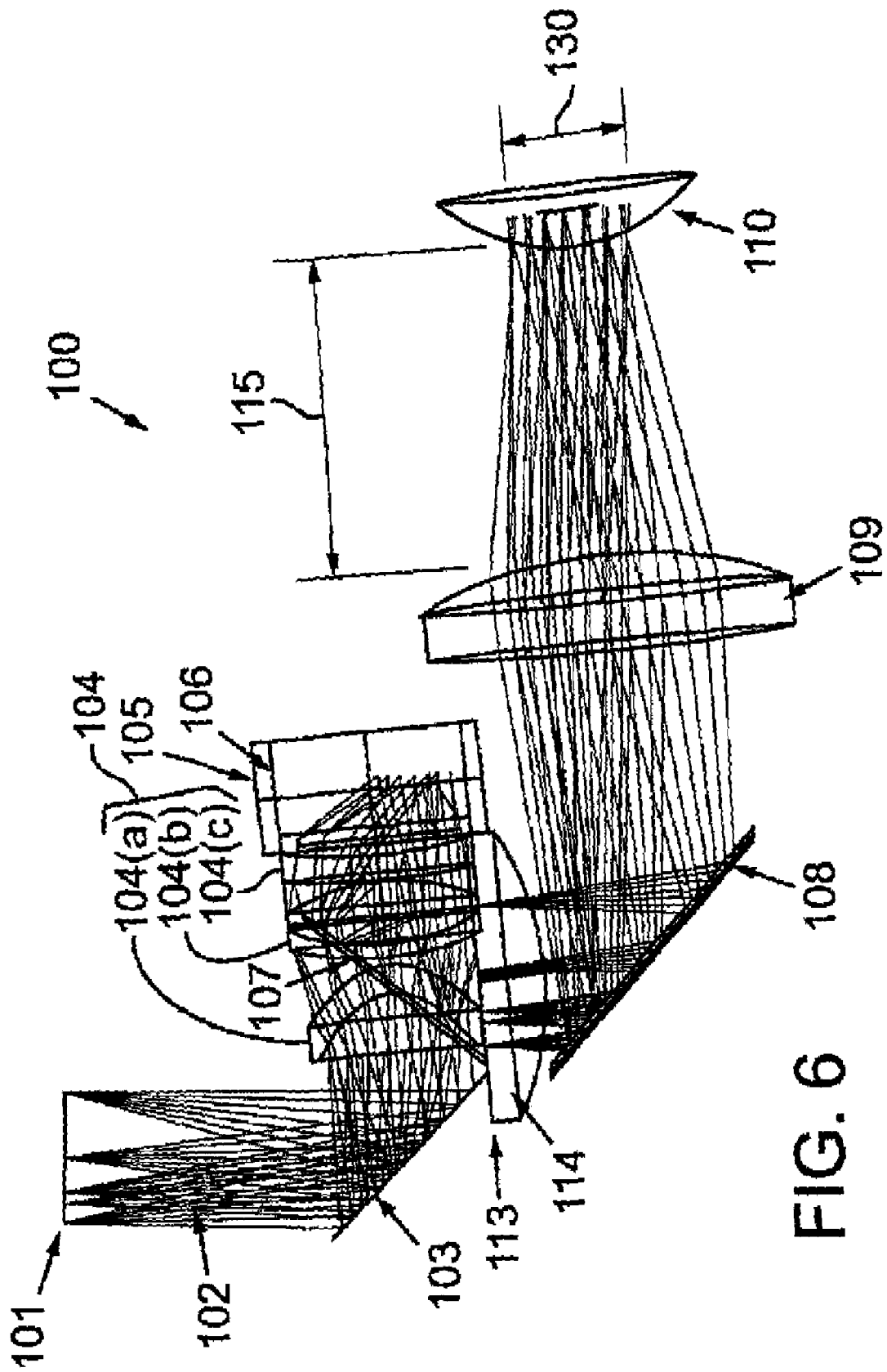
FIG. 6 is a schematic side view of the HMD system of the present invention showing the vertical extent of the viewer's exit pupil.
Figure 7:
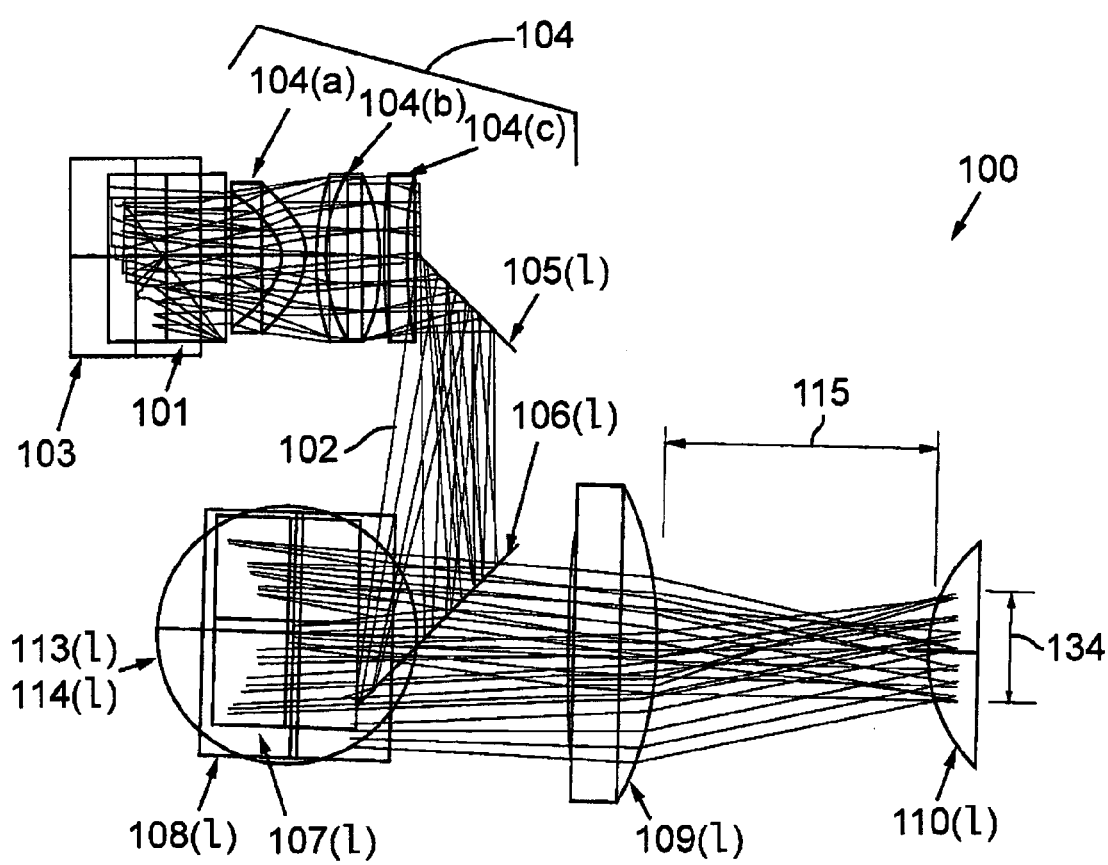
FIG. 7 is a schematic top view of the left viewing channel of the HMD system of the present invention showing the horizontal extent of the viewer's exit pupil.

FIGS. 6 and 7 illustrate the formation of the vertical and horizontal extent of the exit pupil 110. Specifically, the side view of the system shown in FIG. 6 shows how the vertical extent 130 of eyebox 110 is formed. Light 102 propagates from display device 101 to intermediate image plane 113 as previously described. Field lens 114 bends light 102 incident on intermediate image plane 113. The associated microstructure broadens the dispersion of the light 102 so that it propagates toward reflective surface 108 and eyepieces 109 to form an expanded exit pupil 410 at an eye relief distance 115. In this embodiment the diameter of eyepiece lens 109 is preferably about 1 inch and the eye relief distance 115 is about 0.9 inch. The diagonal field of view of the virtual image (not shown) is about thirty degrees. These design values were chosen to comfortably match the resolution of the display device to that of the human eye while maintaining substantial peripheral vision of the viewer's real environment.

The left side of system 100 is seen in the top view of FIG. 7 showing how the horizontal extent 134 of the left exit pupil 110(*l*) is formed. Although only the left side of system 100 is shown for simple illustrative purposes it is understood that the right side of system 100 is a mirror image of the left side thereof. Light 102 is split from objective lens assembly 104 by reflective surface 105(*l*) and is further reflected by reflective surfaces 106(*l*), 107(*l*) through intermediate image plane 113(*l*) and field lens 114(*l*). Light 102 is further reflected by reflective surface 108(*l*) through eyepiece lens 109(*l*) to form the exit pupil 110(*l*) having a horizontal extent of preferably about 10 mm.

As seen in FIG. 8 a diffusing prismatic microstructure 140 is formed on a piano surface of field lens 114 and is placed coincidently with or in direct proximity to intermediate image plane 113. Although only one intermediate image plane and field lens 113, 114 is shown for illustrative clarity it is understood that FIG. 8 represents the structure of both intermediate image plane and field lens combination 113(*r*), 114(*r*) and 113(*l*), 114(*l*). Left and right exit pupils 110(*l*), 110(*r*) are formed by corresponding left and right ray fans of light 102. As mentioned above, the split path system cuts out about half of the ray fan which diminishes the horizontal extent of exit pupils 110(*r*), 110(*l*) by about half. Microstructure 140 forms a scattering surface that fills in the missing side of the ray fan to reconstruct a full-sized and centered horizontal exit pupil with minimal loss of image intensity. Microstructure 140 is a highly magnified nominally vertical prismatic or lens structure that is preferably injection molded into the plano surface of field lens 114. However, microstructure 140 may be formed by any convenient method.

FIG. 9 shows details of microstructure 141 which comprises multiple prismatic structures 142 with at least one prismatic structure 142 for each imaged pixel width 144. Preferably, there are multiple prismatic structures 142 for each pixel width 144 to minimize visual detection and possible aliasing between pixel and scattering structures. Pixel widths may differ depending on the display device. However, in one preferred display device such as, for example, the SVGA+ manufactured by eMagin Corporation discussed above, pixel width 144 is, for example, approximately 18 microns.

FIG. 9 illustrates how microstructure 141 refracts the bundled ray fans of light 102 to expand the exit pupil as discussed above. Bundled ray fans 146 strike microstructure 140 formed on intermediate image plane 113 so that incident biased ray fans 146 are refracted into symmetrical biased ray fans 148 and 150. This microstructure 141 is preferable for use with a display device 101 as described with reference to FIGS. 1–7.

Thus, microstructure 141 provides an expanded exit pupil as best illustrated in FIGS. 10 and 11. FIG. 10 shows distribution of light 102 through a portion of system 100 without a microstructure associated with image plane 113 to form an exit pupil with an insufficient horizontal extent. Light 102 propagates through system 100 from intermediate image plane 113 through field lens 114 and eyepiece lens 109 to exit pupil 110 having a vertical extent of about 10 mm (not shown) and a horizontal extent 150 of about 4 mm which is insufficient for practical and comfortable viewing. It is preferable that exit pupil 110 has a both horizontal and vertical extent of at least 10 mm. As seen in FIG. 11, microstructure 140 is associated with intermediate image plane 113 so that refraction of light 102 is increased forming exit pupil 110 having a horizontal extent 152 of about 10 mm. The vertical extent of exit pupil 110 is not shown but remains at about 10 mm.

FIGS. 12 and 13 show system 100 rotated to positions of maximum and minimum interocular distance, respectively. Specifically, FIG. 12 shows the left and right subassemblies rotated through a motion represented by arrows 111(*r*) and 111(*l*) up through an angle of about 10 degrees on each side to a position achieving a maximum interocular distance 112 of about 70 mm. In order to accommodate this rotation reflective surfaces 105(*r*) and 105(*l*) have upper inner edges 105(*b*) that are beveled. FIG. 13 shows the left and right subassemblies rotated through a motion represented by arrows 111(*r*) and 111(*l*) down through an angle of about 20 degrees on each side to a position achieving a minimum interocular distance 112 of about 48 mm.

Figure 14:
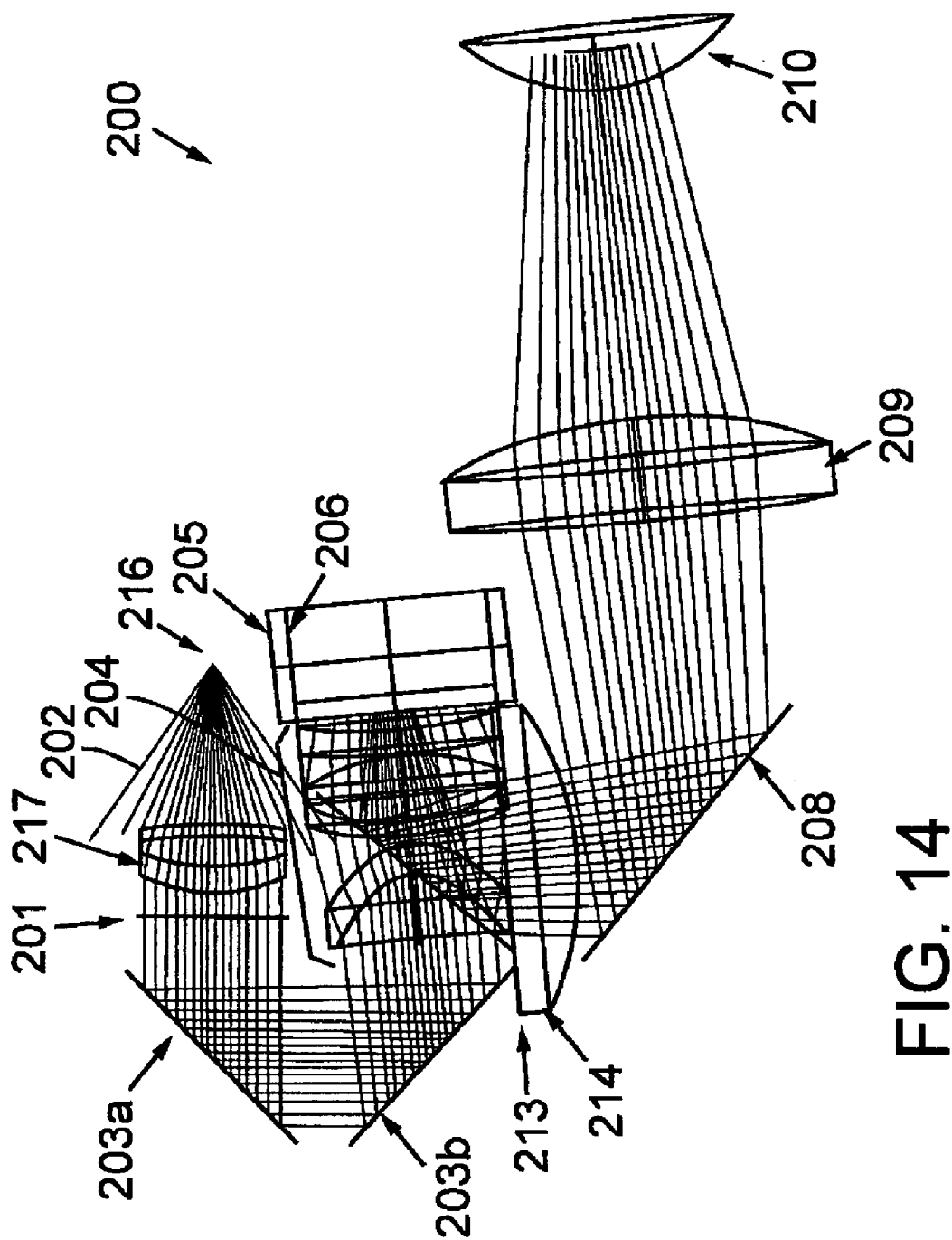
FIG. 14 is a schematic side view of an alternative HMD system showing an illumination system for a transmissive display device.

FIG. 14 shows a side view of an alternative system 200 that utilizes a transmissive display device 201. One example of a preferred transmissive display device is the CyberDisplay 640 Color manufactured by Kopin Corporation of Taunton, Mass. Display device 201 is backlit from a light source which may be one of several different types or a combination of light sources. FIG. 14 illustrates light 202 from an approximate point-source 216, such as, for example, a small-format light emitting diode (LED). Light 202 is collimated by aspheric condenser lens 217 and propagates through system 200 in a manner similar to that described with reference to system 100. However, the location of display device 201 because of the addition of illumination point-source 216 and condenser lens 217 typically requires two reflective folding surfaces 203(*a*) and 203(*b*) for convenient packaging instead of a single reflective surface 103 as seen in FIGS. 1, 6, and 7. In this embodiment, condenser lens 217 is preferably an f/0.75 design. If display device 201 is backlit with a diffuse lighting panel (not shown) rather than a point-source of light the emission of display device 201 would be captured by the entrance pupil of the objective lens assembly 204 with an f/2.8 aperture. In another example, display device 201 may be backlit by a combination of point-source 216 and a diffuse lighting panel (not shown). In this example it is preferred that both point-source 216 and the diffuse lighting panel are diffuse Lambertian emitters of similar efficiency so that, with the use of the aspheric condenser lens 217, system 200 is approximately fourteen times more efficient than it would be with the use of a diffuse lighting panel alone. Since transmissive displays are noted for their inefficient light transmission, this is an important advantage especially if the system is battery-operated. Although only one point source 216 is shown two point sources may be utilized for true stereographic presentation in conjunction with a stereographic video source as seen in FIG. 15.

Figure 15:
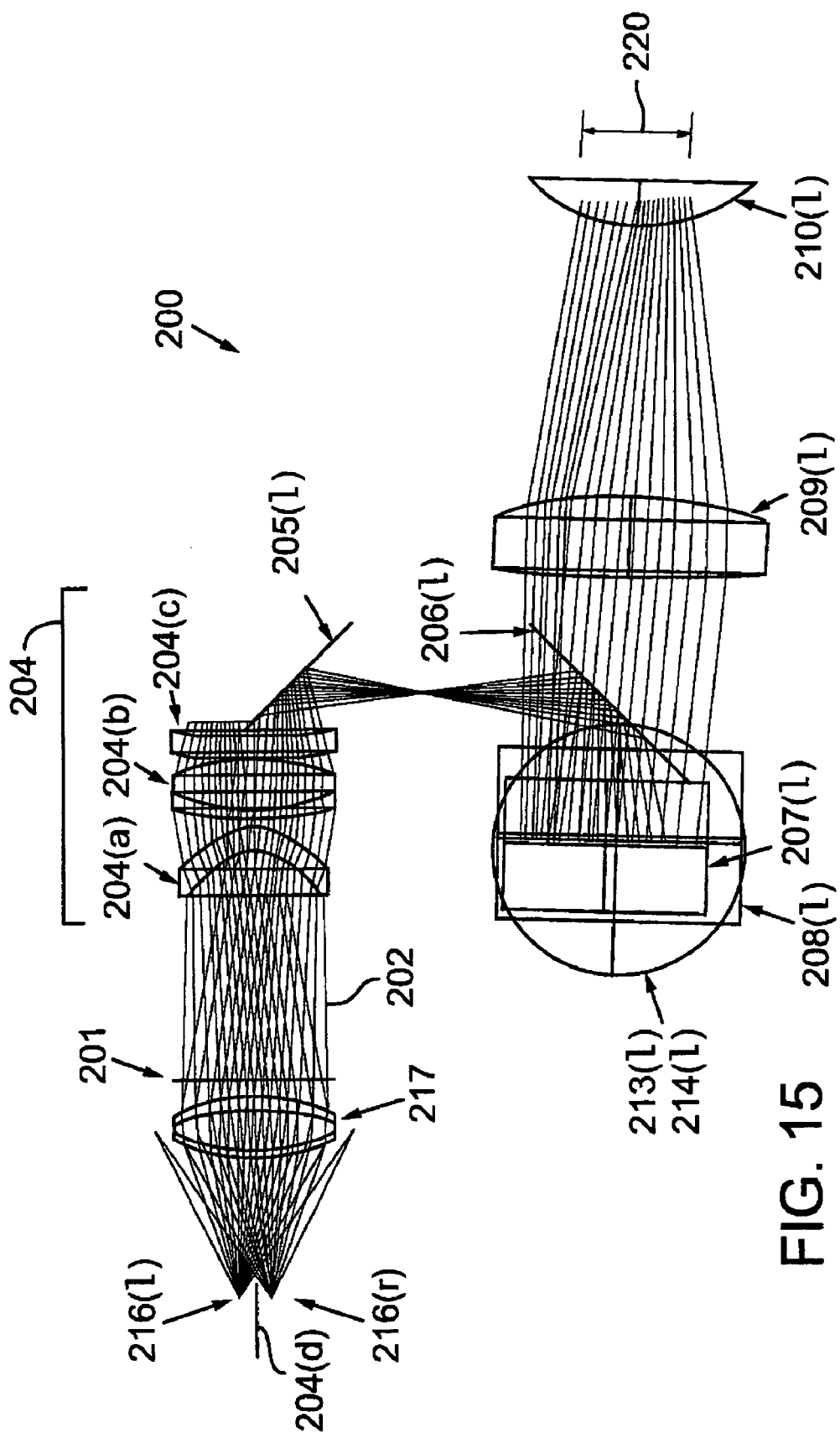
FIG. 15 is a schematic top view of the left viewing channel of the system shown in FIG. 14 utilizing an alternative illumination system.

FIG. 15 shows a top view of only the left side of system 200 for illustrative clarity. However, it is understood that the right side is a mirror image of the left side. For further illustrative clarity, reflective surfaces 203(*a*) and 203(*b*) in FIG. 14 are not shown. Two approximate point-sources of illumination 216(*r*) and 216(*l*) are located on opposite sides and preferably about 0.05 in. from optical axis 204(*d*). A toroidal aspheric condenser lens 217 is located between display device 201 and lens assembly 204. Thus, light 202 from each point-source 216(*r*) and 216(*l*) is independently directed through its own left or right viewing channel. Aside from being able to further double the illumination intensity, this can also be used for true stereographic presentation in conjunction with a stereographic video source by doubling the frame rate of the display's video (to minimize flicker) and synchronously time-domain multiplexing the two point-sources of illumination 216(*r*) and 216(*l*) for sequential right and left images. Light 202 propagates through lens assembly 204 and is reflected by reflective surfaces 205(*l*) and 206(*l*) through intermediate image plane 213(*l*) with an associated microstructure and field lens 214(*l*). Light is further reflected by reflective surface 208(*l*) through eyepiece lens 209(*l*) to exit pupil 210(*l*) having an expanded horizontal extent 220.

Figure 16:
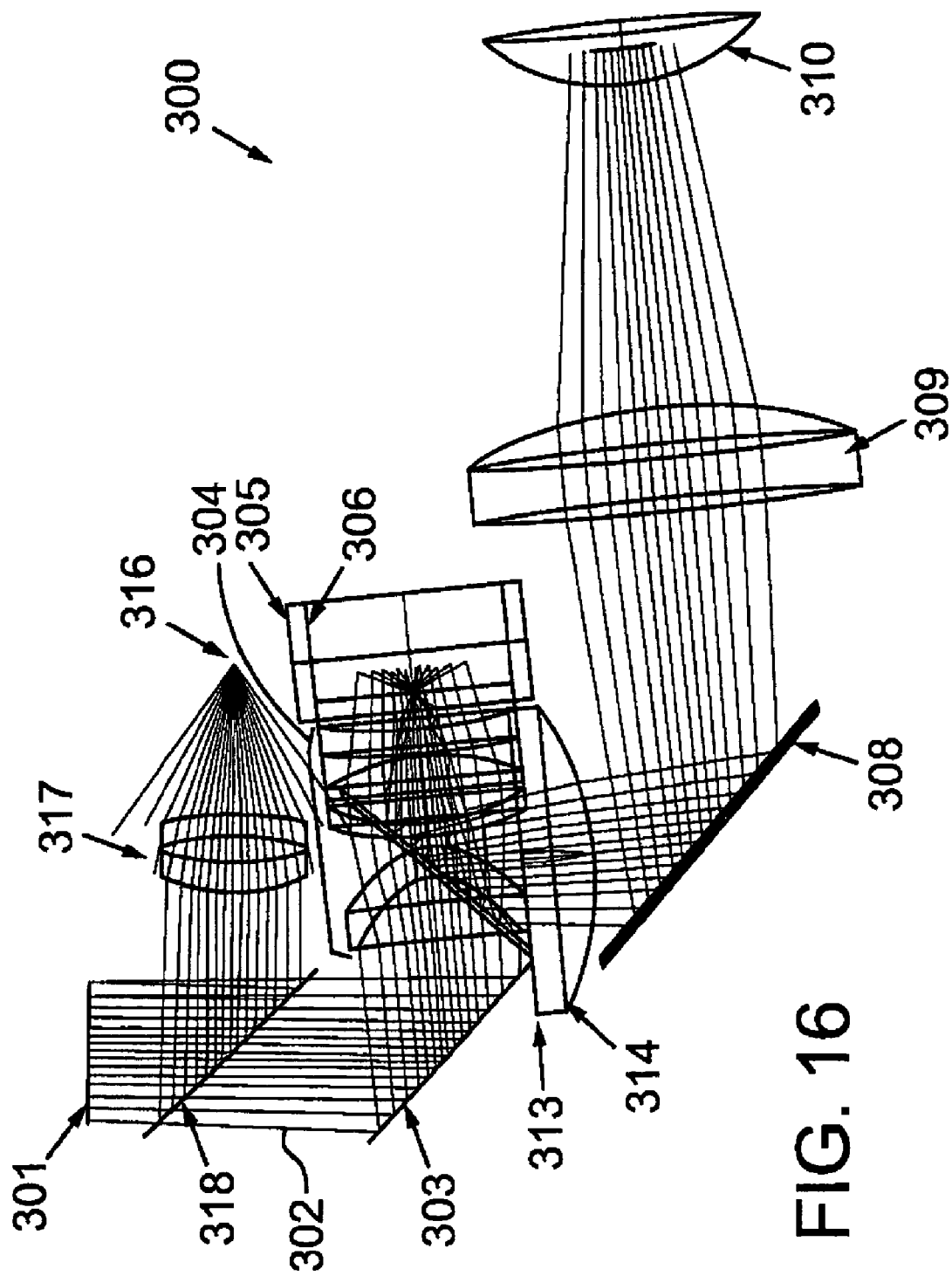
FIG. 16 is a schematic side view of an alternative embodiment of the device shown in FIG. 14.

FIG. 16 illustrates another embodiment of a HMD system 300 utilizing a reflective display device 301. One example of such a device is the MD800 series manufactured by Three-Five Systems, Inc. of Tempe, Ariz. Such display devices 301 are typically liquid crystal on a silicon substrate (LCOS) and require polarized illumination as well as a polarizing analyzer function in the subsequent imaging optics. These two polarizing functions are usually carried out by a polarizing beam splitter 318. In this embodiment, approximate point-sources of illumination 316 such as, for example, small-format light emitting diodes (LED's), are collimated by toroidal aspheric condenser lens 317 to be polarized by reflection off of polarizing beamsplitter 318, and incident onto reflective display device 301. The polarization of the incident light is phase-modulated at each pixel according to the desired contrast and is reflected by the display's electrodes back to and through polarizing beamsplitter 318, where the image contrast becomes fully developed. Light 302 then passes through the system 300 in a similar fashion to prior embodiments.

Figure 18:
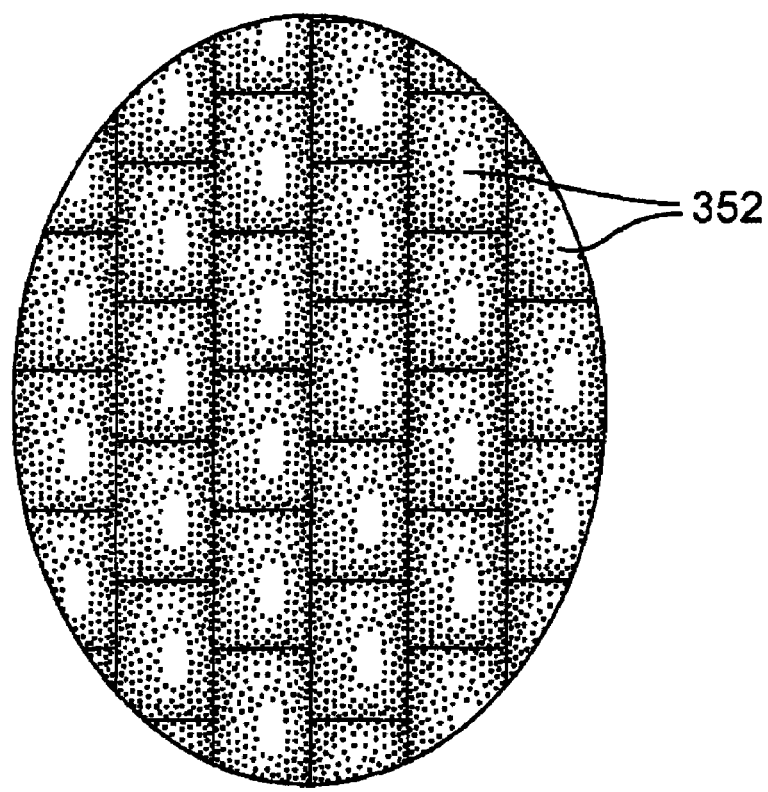
FIG. 18 is a top view of the microstructure of FIG. 17.
Figure 17:
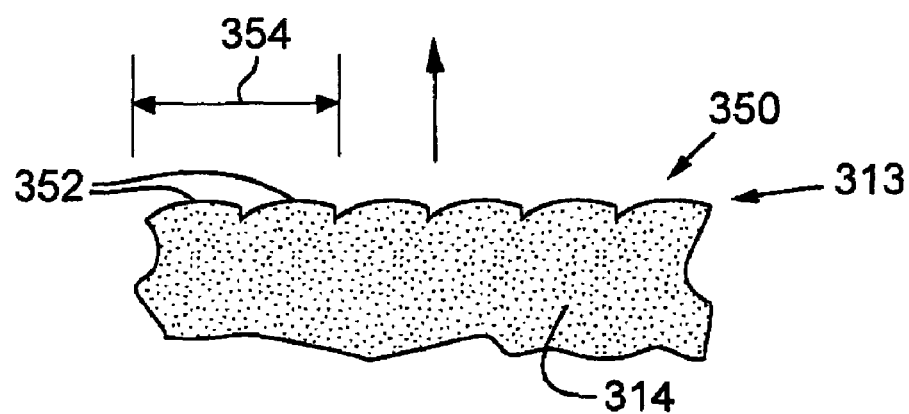
FIG. 17 is a partial view of segment BB of FIG. 8 showing an alternative microstructure.

FIGS. 17 and 18 illustrate an alternative microstructure 350 for association with the intermediate image plane 313 for use with display devices utilizing nearly collimated illumination as illustrated in FIGS. 14–16. In these cases, the collimated illumination delivered through a pixel does not fully fill either half of the exit aperture of lens assembly 304. Consequently, the illumination only partially fills the desired exit aperture in both the horizontal and vertical direction. Thus, microstructure 350 must diffuse light in both horizontal and vertical directions but more so horizontally than vertically. The illustrated toroidal lens array microstructure 350 accomplishes this by having weaker power vertically than horizontally. Note that the lenslets 352 are angularly biased horizontally to accommodate the splitting of the exit aperture of objective lens assembly 304. As with the prismatic structure 141 of FIG. 9, there are several lenslets 352 per projected pixel width 354. Alternate columns of lenslets 352 are staggered to minimize visible pixilation.

While the toroidal structure shown in FIGS. 17 and 18 is preferable as the most efficient form of scattering surface, it is obvious to those skilled in the art that other structures are practical as well. For example, the prismatic structure could be replaced with a best-fit cylindrical surface. Alternatively, the structure could be an array of toroidal microlenses, weaker in power vertically, to additionally augment the vertical extent of the exit pupil with consequent further loss of image intensity.

Figure 19:
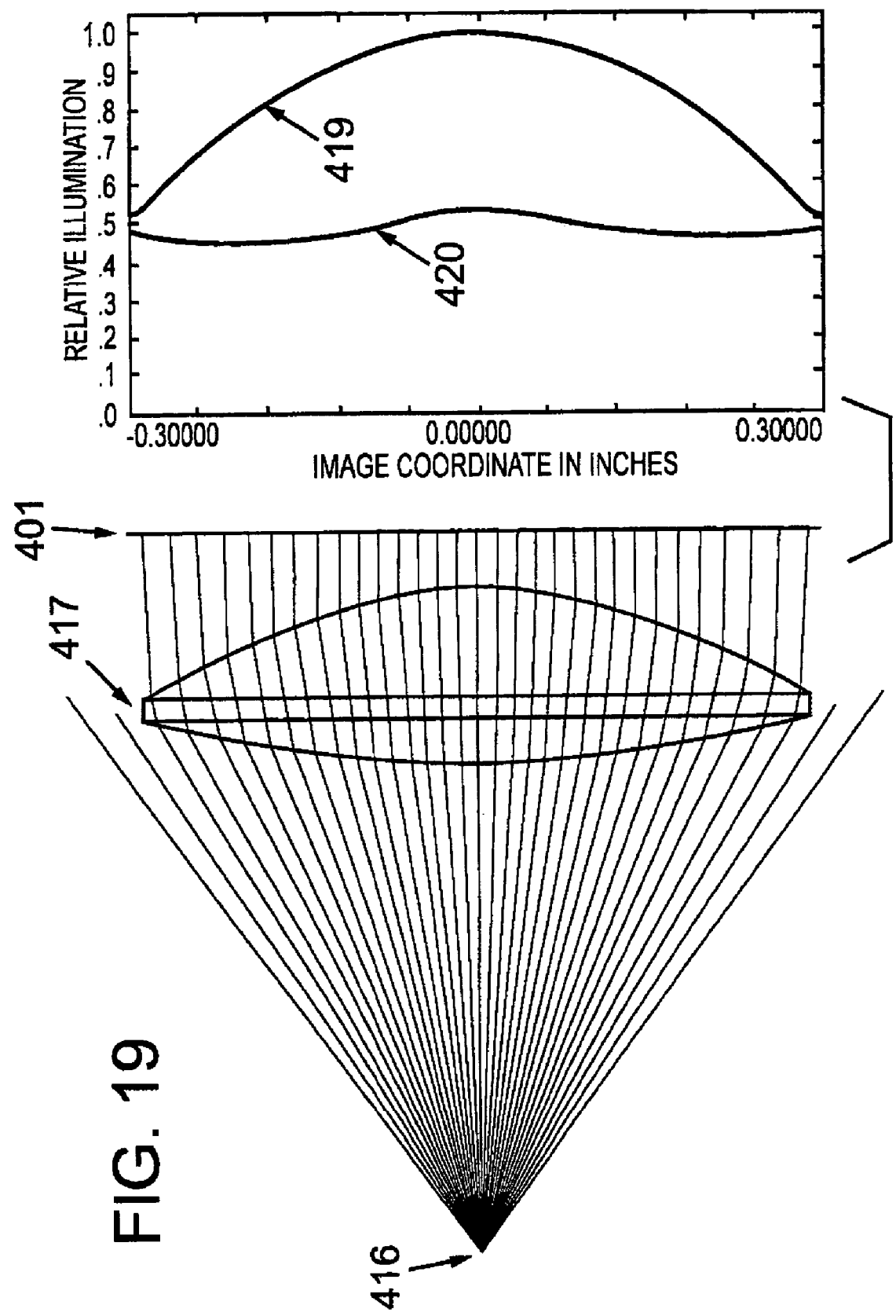
FIG. 19 is a schematic view of a display illumination subsystem of the type utilized in the present invention and a graphic illustration of relative illumination to image coordinate comparing prior art systems and the system of the present invention.

FIG. 19 schematically illustrates the relative illumination plot of light of a portion of a system described in FIGS. 14–16 from a point-source of illumination 416 through aspheric condenser lens 417 and onto display device 401 which may be either a reflective or transmissive type as viewed diagonally across the largest field of the display. The plot shows relative illumination against image coordinate in inches. Light from point-source 416 is illustrated as having a Lambertain distribution of intensity. Plot line 419 depicts a common problem with low f/number collimators. Such collimators exhibit substantial field shading shown at 416 to be approximately 50% from center to diagonal corner. Since it has been shown in the discussion of FIG. 14 that this illumination subsystem is extremely efficient, an averaged loss of approximately 30% over the field is probably quite tolerable for most applications. In order to control field shading, a neutral-density dye may be added to the lens-molding polymer. With lens 417 including the dye the center attenuation is about 50% where condenser lens 417 is the thickest and attenuation will only be about 6% at the corner where condenser lens 417 is the thinnest. This technique results in the field flattening illustrated in relative illumination plot 420 showing substantial improvement. Alternatively or in conjunction with this approach the same technique can be applied to field lens 114 in FIG. 6, field lens 214 in FIGS. 14–15, and field lens 314 in FIG. 16.

There are a number of options for delivering video data from a video source such as, for example, a camera, television, computer, video game, or other remote source, to the head-mounted display of the present invention. The video interface can be tethered with an electronic cable. Alternatively, the video interface can be wireless using radio frequency (rf) or electro-optical (usually infrared (IR)) technologies. An electro-optical link is advantageous because it eliminates any emissions from an rf link which may preclude its use in certain environments such as, for example, in an aircraft or surgical operating room. Additionally, an electro-optical link is more ergonomically advantageous because it is untethered.

Figure 20:
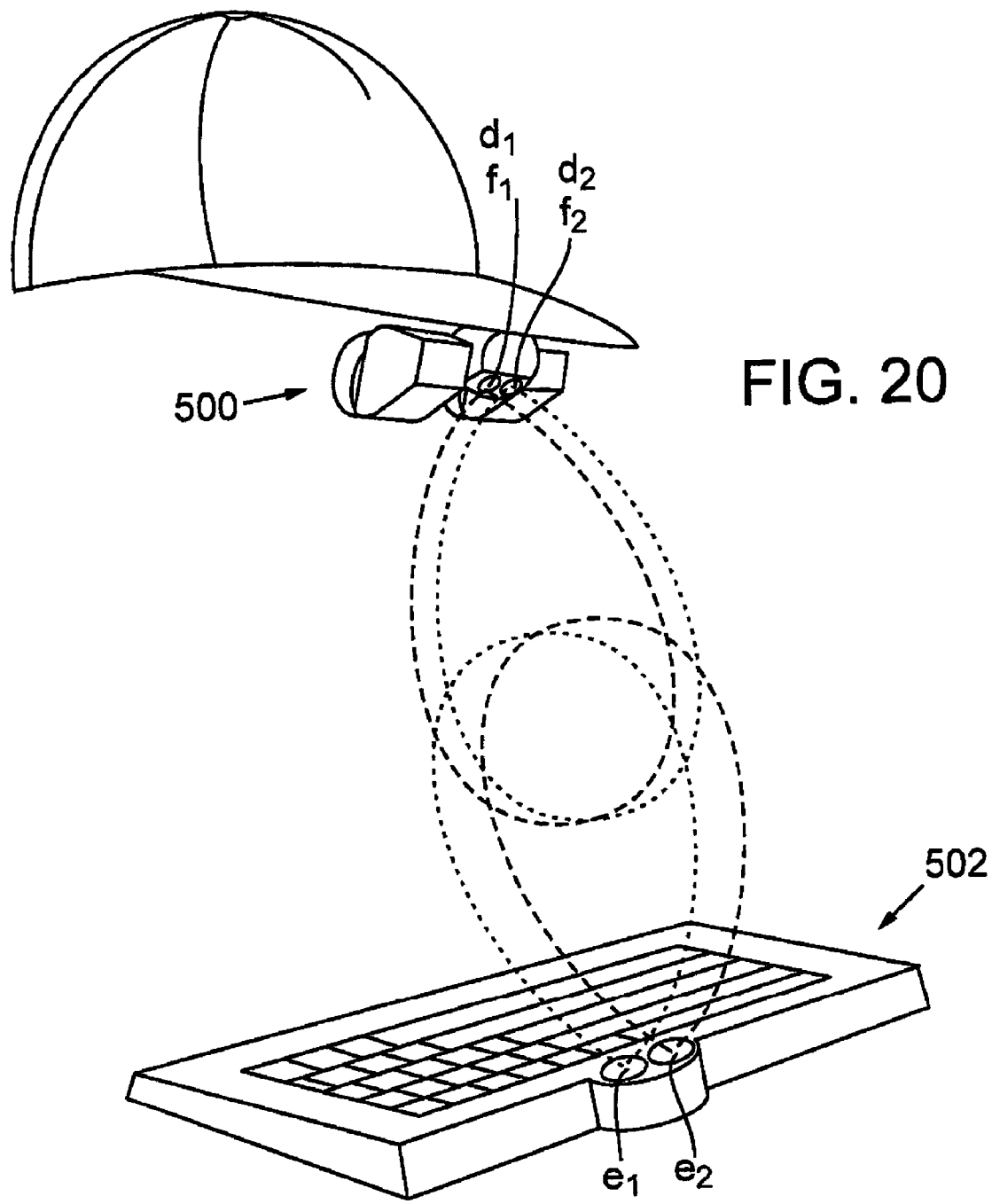
FIG. 20 is an alternative embodiment of a viewing system having a wireless interface.

FIG. 20 depicts a physical configuration for the optical video interface. The HMD 500 has detectors d1 and d2 and filters f1 and f2 nominally facing toward the video source; in this case illustrated as a computer keyboard 502. Video source 502 has LED emitters e1 and e2 nominally facing toward HMD 500. The fields of view of detectors d1 and d2 are wide enough to provide comfortable head motion and reasonable displacement, but not so wide as to unnecessarily detect interfering ambient light sources which would result in undesirable noise. Emitters e1 and e2 and detectors d1 and d2 must have some commonality of fields.

Figure 21:
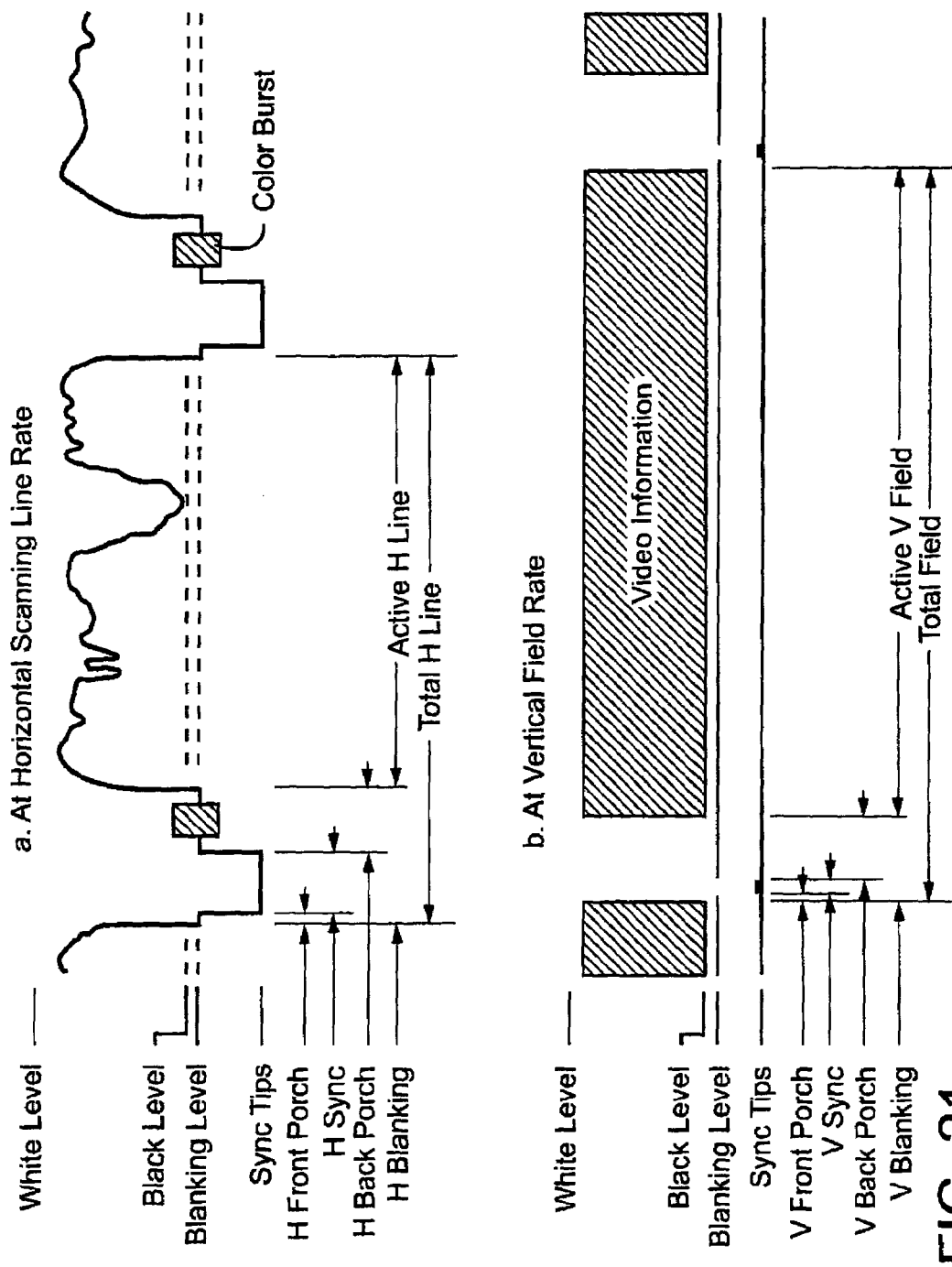
FIG. 21 is a schematic illustration of a conventional composite video signal.

FIG. 21 illustrates the standardized structure of a composite-format video of the National Television Standards Committee (NTSC) which is used in the U.S. or the higher resolution Phase Alternating Lines (PAL) used in Europe and other countries outside the U.S. The structure contains all the signal components required to recreate the transmitted television picture on a single-channel analog signal, including vertical and horizontal sync, blanking and clamp reference signals, color bursts, and the video itself. The NTSC format is a 525 scan line standard while the PAL format is a 625 scan line standard. The computer display standard to which many modern microdisplays conform is SVGA which consists of 600 vertical pixels by 800 horizontal pixels. It is generally interfaced in a three-channel (often four, with sync) analog RGB (red, green, blue) configuration. With some modification, an SVGA signal can then be modified into a subset of a PAL signal using standard electronic components such as the Analog Devices AD725 video encoder chip and other hardware to transmit a composite IR signal. Technically, the HMD configurations of this invention are capable of using a number of types of microdisplays. Using modern electronic and electro-optic components, a short-range IR system can be implemented efficiently and inexpensively. Thus, FIG. 21 illustrates an example of such an IR subsystem in which the video illuminance data is scanned out in groups of 800 pixels for each active horizontal line as illustrated. Color data is synchronized by the color burst at the beginning of each horizontal line.

Figure 22:
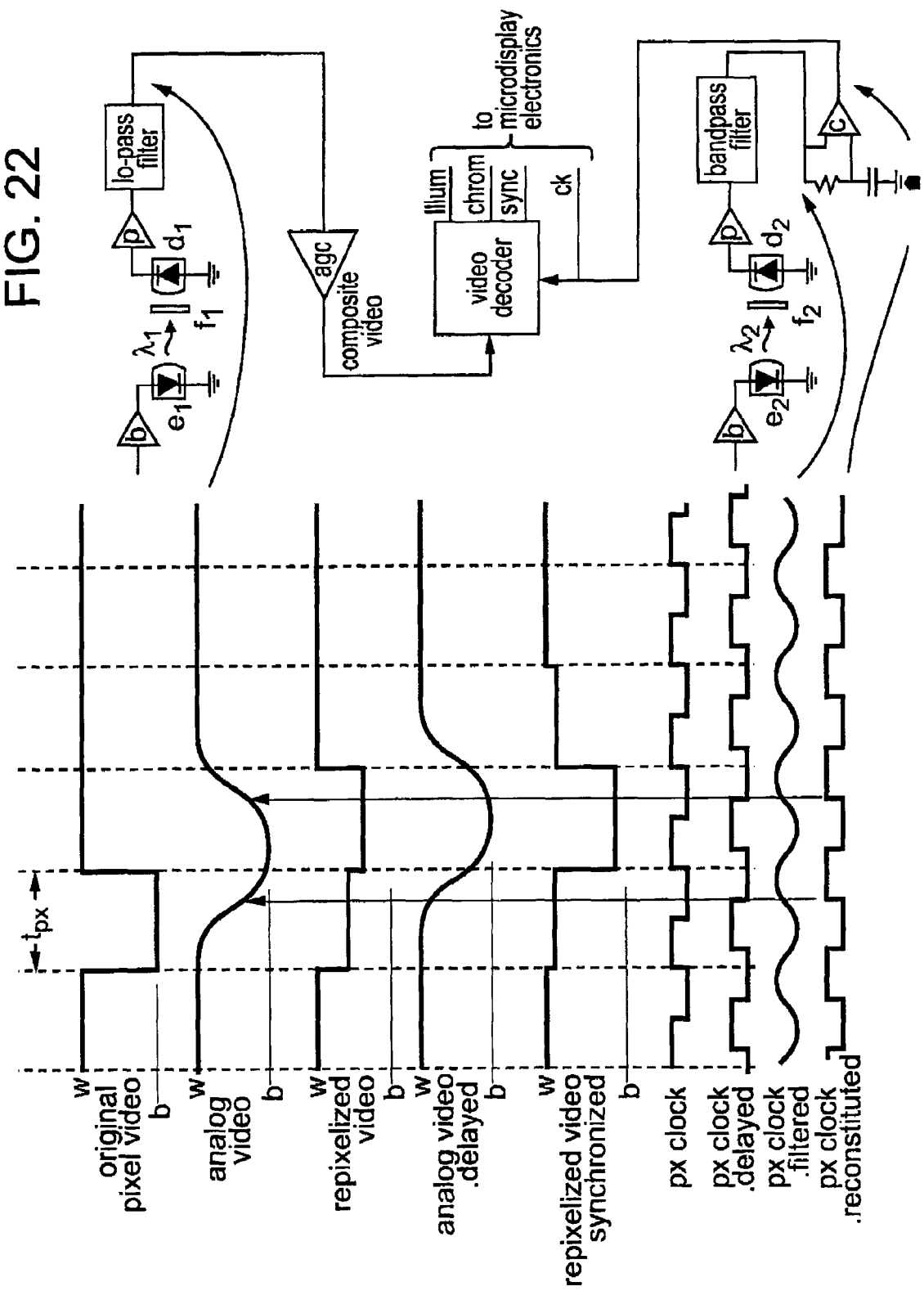
FIG. 22 is a schematic illustration of a distorted digitally-sourced signal.

FIG. 22 illustrates video and timing waveforms on a more microscopic pixel-by-pixel basis to illustrate the potentially degrading effects of the double conversion from digital-format video source to analog video, and then back to digital format for a pixilated digital display device. Original pixel video is illustrated as a single pixel full-contrast white-to-black signal, such as generated by a computer, for example, as a dot or a vertical line. When converted to analog video with a finite electronic bandwidth, the signal is spread and delayed. (It is shown as being spread symmetrically, such as with a linear-phase filter, to avoid asymmetric distortions.). If this analog signal is then again converted to "repixelized video" (illustrated for simplicity using averaging within each pixel window), the resulting signal is indeterminately spread into multiple pixels depending on the phasing of the delay with respect to the pixel clock. It is illustrated with a little more than a ½ pixel analog delay as a worst-case illustration of the spreading, with two pixels of gray level with about 50% of the original modulation. If, on the other hand, the analog video is delayed exactly one full pixel (as illustrated with the "analog video, delayed" signal), the "repixelized video, synchronized" signal illustrates minimal spreading, a little shadow to either side of a near-fully modulated single pixel.

Thus, FIG. 22 illustrates that the double video conversation process can be made acceptable with an appropriate analog video delay. But in a wireless video interface, the problem of recreating the pixel clock at the receiving end remains. While this can be done with a phase-locked loop (PLL) operating off of the separated horizontal sync signal from the video decoder, creating 800 pixel clocks per horizontal scan, there is the probability of pixel slippage due to uncertain timing from PLL drift and random noise encountered in the transmission process. It also burdens the HMD electronics with added hardware and power consumption, thereby increasing weight and reducing battery life. Alternatively, the PLL can be located at the transmitter end, deriving its noise-free sync signal from the RGB signal, or better yet, avoiding the PLL altogether by accessing a computer's dot clock directly (for example, on a VESA connector). The clock signal can then be sent to the HMD on a separate optical data channel. Since this is a fixed-frequency digital signal, it can be sent over a narrow-bandpass, low amplitude signal (as compared with the wide-band, higher amplitude video signal) without suffering a significant degradation of signal-to-noise ratio. Aside from the electronic bandpass filtering, the clock signal can be further differentiated from the video signal with optical filtering.

In further detail, FIG. 22 also shows that, as an alternative to delaying the analog waveform to match the clock phase, the pixel clock can be delayed so that, when reconstituted at the HMD receiver, it matches the original waveform, as received. This is a simpler and preferred technique.

In summary, FIG. 22 illustrates a composite analog video signal at a pixel level driving infrared light emitting diode (IRLED) e1 through a buffer amplifier b. A very high speed IRLED such as, for example, Infineon's SFH4200 can be driven with this signal at sufficient bandwidth and power to avoid loss of analog resolution at a sufficient signal-to-noise ratio (less than 30 inches from keyboard to HMD, for example). However, multiple diodes can be used for greater range. The optical signal emitted from IRLED e1 is transmitted through filter f1 to detector d1 both of which are located on HMD 500 (FIG. 20). The detected electronic video signal is then passed to low-noise preamplifier p and a low-pass filter to further minimize noise and refine signal symmetry. The video signal is then passed through the agc amplifier to the video decoder which separates the composite components into its illuminance, chrominance and sync signals as required by the microdisplay's electronics. A PAL-compatible commercial decoder such as the Philips SAA7110 may be suitable as a component of this function. The video decoder and the display receive their clock signal from a similar optical link. "Px clock, delayed" is passed through buffer amplifier b, driving LED e2. This LED may either be IR or visible. But as a visible, it can be of sufficiently low intensity to appear as an indicator light of low intensity and can be differentiated from the IR channel by a simple color filter f2 rather than less efficient and orientation-dependent polarizing filter pairs. The filtered optical clock signal is detected by d2, amplified by low-noise preamplifier p, and bandpass filtered to minimize noise. Comparator c returns it to a digital state.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

I claim:

1. A head-mounted viewing system, comprising;
   a display device having a substantially planar surface;
   an objective lens assembly extending along an optical axis and located substantially adjacent the display device through which light propagates from the display device along the optical axis through an exit aperture of the objective lens assembly;
   a split-field reflector substantially adjacent the exit aperture of the objective lens assembly that directs substantially half of the light along a right optical path to form an image on a right exit pupil and substantially the other half of the light along a left optical path to form an image on a left exit pupil;
   a folding apparatus to correctly orient the image to the respective right and left exit pupil;
   a right intermediate image plane located along the right optical path and a left image plane located along the left optical path; and
   exit pupil enhancement structure located along the right and left optical paths to prescriptively enlarge each right and left exit pupil.

2. The system of claim 1, wherein the split-field reflector is a pair of reflective surfaces with each reflective surface disposed at about a 45 degree angle to the optical axis.

3. The system of claim 2, wherein the reflective surfaces nominally meet along a vertical edge extending through the optical axis.

4. The system of claim 3, wherein the reflective surfaces are mirrors.

5. The system of claim 1, wherein the folding apparatus comprises a right folding apparatus and a left folding apparatus, the right folding apparatus including a first right folding apparatus and a second right folding apparatus both located along the right optical path and the left folding apparatus including a first left folding apparatus and a second left folding apparatus both located along the left optical path.

6. The system of claim 5, wherein the right folding apparatus and the left folding apparatus are rotatable about the optical axis to displace the images directed to the right and left exit pupils to substantially match a viewer's interocular spacing without rotation of the images.

7. The system of claim 5, wherein the first right folding apparatus and the first left folding apparatus each comprise a first right and left pair of reflective surfaces, respectively.

8. The system of claim 7, wherein one of the pair of reflective surfaces of each of the first right folding apparatus and the first left folding apparatus forms the split-field reflector.

9. The system of claim 5, wherein the second right folding apparatus and the second left folding apparatus each comprise a second right and left pair of reflective surfaces.

10. The system of claim 9, wherein each pair of reflective surfaces comprises mirrors.

11. The system of claim 9, wherein the right intermediate image plane is formed between the second right pair of reflective surfaces and the left intermediate image plane is formed between the second left pair of reflective surfaces.

12. The system of claim 11, wherein each exit pupil enhancement structure is associated with each right and left intermediate image plane.

13. The system of claim 12, wherein the exit pupil enhancement structure is a diffusing microstructure.

14. The system of claim 13, wherein the exit pupil enhancement structure is formed on a plano surface of a field lens.

15. The system of claim 1, wherein the display device is a light emissive microdisplay.

16. The system of claim 1, wherein the display device is a transmissive display device that is backlit by a light source and further including an aspheric condenser lens located between the light source and the display device to nominally collimate the light.

17. The system of claim 16, wherein the condenser lens is toroidal.

18. The system of claim 16, wherein the light source includes a left light source and a right light source, the left and right light sources being spaced from the optical axis so that the left light source provides illumination to the left optical path and the right light source provides illumination to the right optical path.

19. The system of claim 18, wherein the left and right light sources are sequentially illuminated synchronously with alternating frames of video to produce stereographic imagery from an appropriate stereographic video source.

20. The system of claim 1, wherein the display device is a reflective display device and further including a light source for emitting light through an aspheric condenser lens to the reflective device.

21. The system of claim 20, wherein the condenser lens is toroidal.

22. The system of claim 20, wherein the light source includes a left light source and a right light source, the left and right light sources being spaced from the optical axis so that the left light source provides illumination to the left optical path and the right light source provides illumination to the right optical path.

23. The system of claim 22, wherein the left and right light sources are sequentially illuminated synchronously with alternating frames of video to produce stereographic imagery from an appropriate stereographic video source.

24. The system of claim 1, further comprising a radio frequency or electro-optical wireless video interface.

25. The system of claim 24, further comprising a head-mounting structure having a plurality of detectors and filters that receive signals from plural sources, wherein the plural sources include modulated optical emitters from which the signals are sent.

26. The system of claim 25, wherein the sources emit one pixel clock signal and one composite video signal, wherein each signal has an associated emitter and detector pair.

27. The system of claim 26, wherein the pixel clock signal and the composite video signal are mutually isolated by means of optical filters.

28. The system of claim 25, wherein the modulated optical emitters are LED's.

29. The system of claim 1, wherein the viewing system is mounted on a visor of a cap.

* * * * *